(12) United States Patent
Nandan et al.

(10) Patent No.: US 11,863,713 B2
(45) Date of Patent: Jan. 2, 2024

(54) METHODS AND APPARATUS FOR IMAGE FRAME FREEZE DETECTION

(71) Applicant: Texas Instruments Incorporated, Dallas, TX (US)

(72) Inventors: Niraj Nandan, Plano, TX (US); Brian Chae, Duluth, GA (US); Mihir Mody, Bangalore (IN); Rajasekhar Reddy Allu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 152 days.

(21) Appl. No.: 16/669,138

(22) Filed: Oct. 30, 2019

(65) Prior Publication Data
US 2021/0136358 A1 May 6, 2021

(51) Int. Cl.
*H04N 17/00* (2006.01)
*H04N 5/14* (2006.01)
*H04N 7/18* (2006.01)

(52) U.S. Cl.
CPC ........... *H04N 17/004* (2013.01); *H04N 5/144* (2013.01); *H04N 7/183* (2013.01)

(58) Field of Classification Search
CPC .... G06T 7/0002; H04N 17/004; H04N 5/144; H04N 7/183
See application file for complete search history.

(56) References Cited

U.S. PATENT DOCUMENTS

| 7,424,664 | B2 * | 9/2008 | Wu | ........................ | H04L 1/0045 |
| | | | | | 714/776 |
| 2002/0196373 | A1 | 12/2002 | Szybiak et al. | | |
| 2009/0147861 | A1 * | 6/2009 | Schnebly | ............... | H04N 7/183 |
| | | | | | 375/240.27 |
| 2012/0163704 | A1 | 6/2012 | Chang et al. | | |

(Continued)

FOREIGN PATENT DOCUMENTS

| KR | 20050072386 A | 7/2005 |
| RU | 2642402 C1 * | 1/2018 |
| RU | 2642402 C1 | 1/2018 |

OTHER PUBLICATIONS

International Search Report for PCT/US2020/058084 dated Jan. 28, 2021.

(Continued)

*Primary Examiner* — Michael J Hess
*Assistant Examiner* — Naod W Belai
(74) *Attorney, Agent, or Firm* — Michael T. Gabrik; Frank D. Cimino

(57) ABSTRACT

Methods, apparatus, systems, and articles of manufacture are disclosed for image frame freeze detection. An example hardware accelerator includes a core logic circuit to generate second image data based on first image data associated with a first image frame, the second image data corresponding to at least one of processed image data, transformed image data, or one or more image data statistics, a load/store engine (LSE) coupled to the core logic circuit, the LSE to determine a first CRC value based on the second image data obtained (Continued)

from the core logic circuit, and a first interface coupled to a second interface, the second interface coupled to memory, the first interface to transmit the first CRC value obtained from the memory to a host device.

7 Claims, 15 Drawing Sheets

(56) References Cited

U.S. PATENT DOCUMENTS

| | | | | |
|---|---|---|---|---|
| 2012/0237101 | A1* | 9/2012 | Kaempfer | A61B 6/032 |
| | | | | 382/131 |
| 2015/0281742 | A1* | 10/2015 | Staudenmaier | H04N 19/89 |
| | | | | 375/240.27 |
| 2016/0364875 | A1* | 12/2016 | Seki | G06T 19/006 |
| 2018/0181816 | A1* | 6/2018 | Garud | G06T 7/269 |
| 2018/0189105 | A1 | 7/2018 | Sanghvi et al. | |
| 2018/0322387 | A1* | 11/2018 | Sridharan | G06F 9/547 |
| 2019/0075290 | A1* | 3/2019 | Dubey | H04N 17/002 |
| 2019/0188066 | A1 | 6/2019 | Mody et al. | |
| 2020/0081836 | A1* | 3/2020 | Kaushikkar | G06F 12/0831 |
| 2021/0067173 | A1* | 3/2021 | Miele | H04L 1/0061 |

OTHER PUBLICATIONS

Prashanth et al., "A Diverse Low Cost High Performance Platform for Advanced Driver Assistance System (ADAS) Applications," 2016 IEEE Conference on Computer Vision and Pattern Recognition Workshops, Jun. 26, 2016, pp. 819-827.

Extended European Search Report, European Patent Application No. 20883399.6, dated Nov. 24, 2022, eight pages.

* cited by examiner

METHODS AND APPARATUS FOR IMAGE FRAME FREEZE DETECTION

FIELD OF THE DISCLOSURE

This disclosure relates generally to image processing and, more particularly, to methods and apparatus for image frame freeze detection.

BACKGROUND

Safety protocols are used to ensure safety in electrical and/or electronic systems. For example, International Organization for Standardization (ISO) 26262 is an international standard for functional safety of electrical and/or electronic systems in automobiles. Such safety protocols analyze risk (e.g., the combination of the frequency of occurrence of harm and the severity of that harm) associated with electronic failures. Failures corresponding to electronics may be random or systematic. Random failures typically correspond to hardware related permanent or transient failures due to a system component loss of functionality. Systematic failures typically correspond to design faults, incorrect specifications, and/or not fit for purpose errors in software. Such safety protocols may analyze the electrical risks associated with signal processing sub-systems (e.g., vision imaging sub-systems) that may process a signal to improve vehicle safety.

Figure 1:
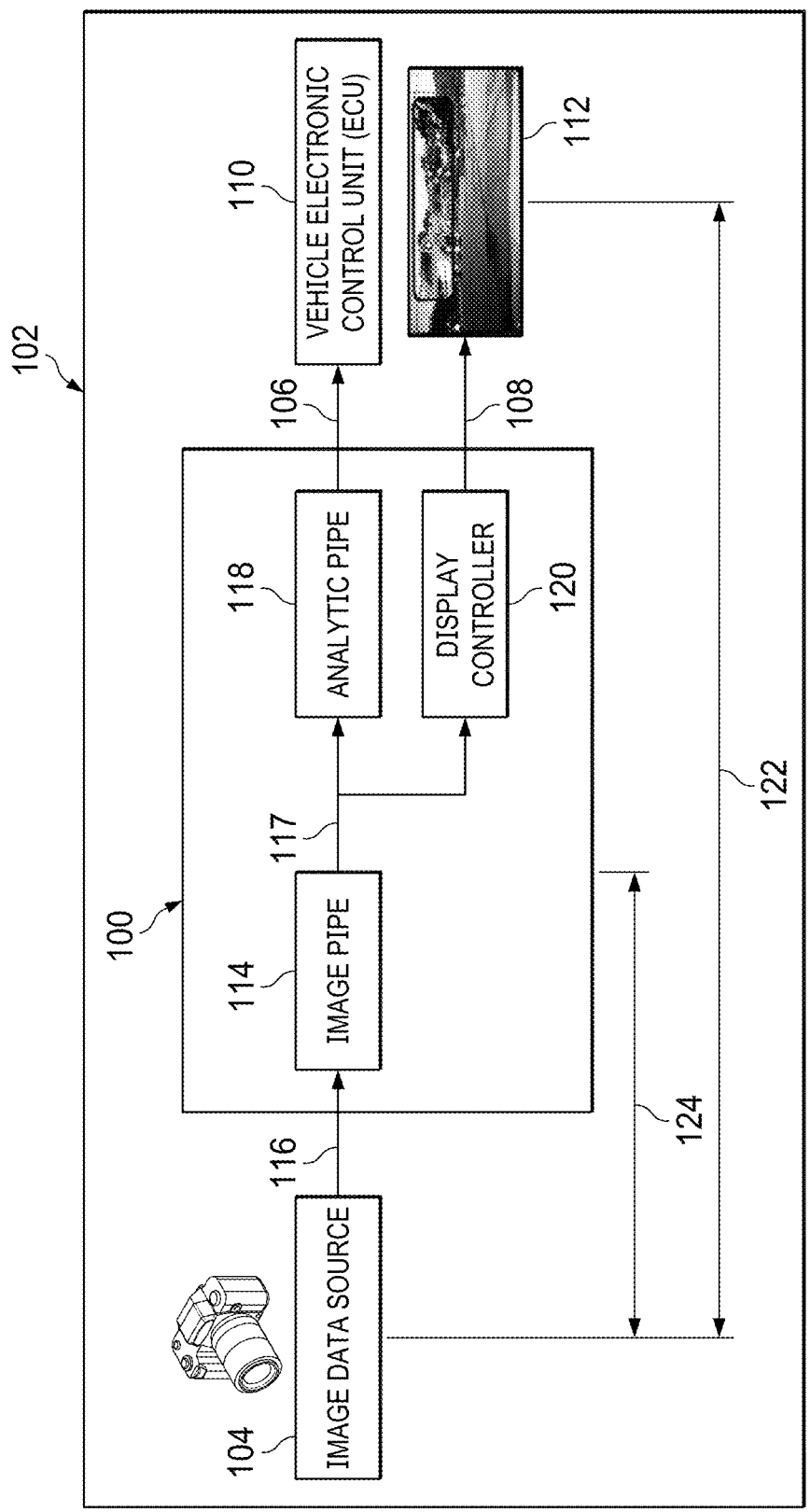
FIG. 1 depicts an example implementation of a data processing pipeline associated with a vehicle imaging system.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The complexity of computing and/or electrical devices has increased significantly with advances in technology. Such devices include hardware, software, and/or firmware to perform particular function(s). If an error occurs in the hardware, software, and/or firmware, such devices may not perform the particular function(s) or may execute the particular function(s) with poor performance. Such inability to perform and/or poor execution performance may affect the results of a related system. For example, an autopilot computing device that can facilitate execution of autonomous operations of a vehicle (e.g., an air-based vehicle, a land-based vehicle, etc.) may obtain raw image data from a sensor and transmit the raw image data to a vision imaging sub-system (VISS) (e.g., a visual image processing sub-system) to process the raw image data and/or render an image based on the raw image data. Once the autopilot computing device receives the rendered image, the autopilot computing device may make navigation decisions based on further analysis of the rendered image. To ensure proper navigation decision-making, safety protocols (e.g., safety hooks) may be in place to ensure that electrical and/or electronical systems are functional (e.g., to reduce risk) and that proper data is available for the decision-making process. In some instances, safety protocols may be used in conjunction with the VISS.

A VISS may be utilized in conjunction with a processor to perform signal processing protocols due to the efficiency of such sub-systems. For example, the VISS may process an input signal (e.g., data from an image source) and transmit the processed input signal to the processor. In some instances, the processor may detect a frame freeze (e.g., an image frame freeze) condition at an image data source (e.g., a camera) level. For example, the frame freeze may occur because the camera is broken, damaged, etc., and is erroneously generating output images that are substantially similar to previously generated output images.

In some instances, the processor may detect a frame freeze condition based on a transportation or transmission fault, where the same image data is repeatedly being transmitted to the VISS. In some instances, the processor may detect a frame freeze condition based on the VISS processing faulty outputs, where a current image frame from the VISS does not reflect current conditions captured by the image data source. In such instances, the VISS can generate an erroneous output because of an error in hardware, software, and/or firmware associated with the VISS has led to a generation of the same or a substantially similar rendered image.

In some instances, a hardware accelerator may be used to detect a frame freeze. However, such hardware accelerators are typically too far removed (e.g., too far removed in latency, processing distance, etc.) from an image data source in a data processing pipeline to detect the frame freeze within a desired time period. Accordingly, the hardware accelerator may not detect the frame freeze within an actionable time period by a vehicle or other device.

In some instances, the processor in communication with the hardware accelerator may detect the frame freeze in software by comparing the current image frame to a previous image frame pixel by pixel. However, the processor may generate false negatives because a single pixel may flip from image frame to image frame due to various factors (e.g., sensor noise, external environmental variations, etc.) even though a frame freeze condition has occurred. In addition, such comparisons result in compute loss and a reduction in read bandwidth of an interface between the VISS and the image data source. The compute loss and the reduction in the read bandwidth can occur because of an intensity of computational resources required to perform the comparisons in software that can delay receiving new image frames. Accordingly, such comparisons can increase latency in frame freeze detection and decrease safety of related systems.

Examples described herein detect image frame freeze. In some disclosed examples, at least one processor detects an image frame freeze by comparing raw image data of two different image frames (e.g., two different image frames captured in sequence, in order, etc.). For example, the raw image data can correspond to image data generated by and/or otherwise obtained from one or more cameras, one or more sensors, etc. In some disclosed examples, at least one processor detects an image frame freeze by comparing processed image data of two different image frames (e.g., two different image frames captured in sequence, in order, etc.). For example, the at least one processor can detect the image frame freeze by comparing a first image frame processed by a VISS and a second image frame processed by the VISS.

In some disclosed examples, at least one processor detects an image frame freeze by comparing signatures associated with two different sets of raw image data. For example, the at least one processor can compare (1) a first signature (e.g., a first cyclic redundancy check (CRC) signature) generated based on first raw image data from a camera to (2) a second signature (e.g., a second CRC signature) generated based on second raw image data from the camera. In some disclosed examples, the at least one processor detects an image frame freeze by comparing signatures associated with two different sets of processed image data (e.g., processed image data based on raw image data processed by a VISS). For example, the at least one processor can compare (1) a first signature (e.g., a first CRC signature) generated based on first processed image data processed by a VISS to (2) a second signature (e.g., a second CRC signature) generated based on second processed image data from the VISS.

In some disclosed examples, image frame comparison logic in a beginning or front-end portion of a data processing pipeline detects an image frame freeze. For example, a hardware accelerator can obtain image data from an image data source via an image data interface. The example hardware accelerator can execute a signature capturing algorithm or schema, such as a CRC signature capture, on one or more output channels of the hardware accelerator. The example hardware accelerator can execute the signature capturing algorithm to generate a unique signature that can be retained until a new image frame is processed.

In some disclosed examples, the hardware accelerator calculates and/or otherwise determines an image data statistic based on data transmitted by an output channel of the hardware accelerator. In some disclosed examples, the at least one processor can detect an image frame freeze by comparing signatures associated with image data statistic(s). For example, the at least one processor can compare (1) a first signature (e.g., a first CRC signature) generated based on a first image data statistic associated with first data transmitted by an output channel of the hardware accelerator to (2) a second signature (e.g., a second CRC signature) generated based on a second image data statistic associated with second data transmitted by the output channel.

In some disclosed examples, the hardware accelerator transforms image data (e.g., raw image data, processed image data, etc.) by executing one or more transformation operations (e.g., a neighborhood aware pixel transformation, a census transform or census transformation, etc.). In some disclosed examples, the at least one processor can detect an image frame freeze by comparing signatures associated with transformed image data. For example, the at least one processor can compare (1) a first signature (e.g., a first CRC signature) generated based on first transformed image data transmitted by an output channel of the hardware accelerator to (2) a second signature (e.g., a second CRC signature) generated based on second transformed image data transmitted by the output channel.

Advantageously, the example hardware accelerator can increase processing bandwidth of one or more processors and reduce a latency to detect the frame freeze compared to conventional techniques by comparing CRC signatures (e.g., 32-bit CRC signatures) instead of an entire image frame (e.g., 2 megabytes (MB), 3 MB, etc.). Advantageously, the example hardware accelerator can reduce or, in some examples, eliminate the occurrence of false negatives compared to conventional techniques. For example, the hardware accelerator can reduce and/or otherwise eliminate the occurrence of false negatives by comparing CRC signatures generated based on one or more image data statistics, transformed image data, etc., and/or a combination thereof.

FIG. 1 depicts an example implementation of a data processing pipeline 100 associated with an example vehicle imaging system 102. The vehicle imaging system 102 can correspond to one or more camera systems of a vehicle (e.g., an automobile, an aircraft, a boat, etc.) including a front-facing camera system, a rear-view camera system (e.g., a backup camera system), and/or a side-view camera system. The vehicle can use the one or more camera systems to perform a vehicle maneuver such as making an aerial maneuver (e.g., increasing or decreasing altitude and/or speed, turning the aircraft, etc.), making a land maneuver (e.g., moving forward on a road surface, making a turn on the road surface, etc.), etc. In some examples, the vehicle imaging system 102 is included in and/or otherwise associated with an autonomous vehicle. For example, the autonomous vehicle may use the vehicle imaging system 102 to adjust a direction and/or a speed of the vehicle in relation to object(s) or vehicle(s) in front of or on the side of the vehicle. In some examples, an autonomous vehicle uses the backup camera system to perform a vehicle maneuver (e.g., an autonomous vehicle maneuver) in relation to an object such as backing up towards another object or vehicle.

The vehicle imaging system 102 of FIG. 1 includes an example image data source 104 coupled to the data processing pipeline 100 to capture image(s) and transmit the captured image(s) to the data processing pipeline 100 for processing. The image data source 104 can be a single camera (e.g., a monocular camera, a video camera, etc.) to capture an image (e.g., a mono image, one or more image frames, one or more video frames, etc.) or a live feed of the surroundings of the vehicle. In some examples, the image data source 104 corresponds to two or more cameras to capture images (e.g., stereo images) or live feeds of the surroundings of the vehicle. Alternatively, the image data source 104 may correspond to any other image capturing device such as a thermal imaging camera, an infrared camera, etc.

The vehicle imaging system 102 of FIG. 1 includes the data processing pipeline 100 to convert, translate, and/or otherwise process an image frame (e.g., raw image data, image data, etc.) from the image data source 104 to generate first example output image data 106 and/or second example output image data 108. For example, the first output image data 106 can be transmitted to an example vehicle electronic control unit (ECU) 110 to affect operation of the vehicle. In other examples, the second output image data 108 can be transmitted to an example display panel (e.g., a vehicle display panel) 112 to display a rendered image onto one or more displays or monitors included in and/or otherwise associated with the vehicle.

The data processing pipeline 100 of FIG. 1 includes an example image pipe 114 coupled to the image data source 104. In FIG. 1, the image pipe 114 can correspond to a hardware circuit (e.g., discrete and/or integrated analog and/or digital circuitry, a field programmable gate array (FPGA), a programmable logic device (PLD), a field programmable logic device (FPLD), an application specific integrated circuit (ASIC), a comparator, an operational-amplifier (op-amp), a logic circuit, etc.) structured to perform the corresponding operation without executing software or firmware, but other structures are likewise appropriate.

The data processing pipeline 100 includes the image pipe 114 to process example input image data 116 from the image data source 104 to generate an example processed image frame 117. For example, the input image data 116 can correspond to image data, such as pixel data, captured by the image data source 104. In some examples, the image pipe 114 obtains the input image data 116 from the image data source 104 and extracts data or information of interest from the input image data 116. For example, the image pipe 114 can determine values associated with pixels of an image frame captured by the image data source 104 based on the input image data 116. In such examples, the input image data 116 can correspond to an image frame, such as an RGB image or RGB image frame, with pixel values corresponding to defining red, green, and blue color components for each pixel. In other examples, the input image data 116 can include values corresponding to image characteristics such as brightness, hue, and/or saturation. In yet other examples, the input image data 116 can include a set of image data parameters with corresponding values, where the image data parameters can include a number of rows (e.g., an image frame height), a number of columns (e.g., an image frame width), a number of bands, a number of bits per pixel (bpp), a file type, etc. Additionally or alternatively, the input image data 116 from the image data source 104 may be in any other image format such as portable bitmap (PBM), portable pixelmap (PPM), etc., and/or may be represented using any other data representation such as binary values, hexadecimal values, ASCII characters, etc., and/or a combination thereof.

In some examples, the image pipe 114 can determine one or more parameters (e.g., diagnostic parameters, image data parameters, image data statistics, image pipe statistics, etc.) associated with the input image data 116. For example, the image pipe 114 can execute a signature capturing algorithm or schema, such as a cyclic redundancy check (CRC) signature capture, on one or more output channels of the image pipe 114 to generate a unique signature that can be retained until a new image frame is processed. In such examples, the image pipe 114 can transmit one or more CRC signatures to at least one of an example analytic pipe 118 or an example display controller 120 for further processing. For example, the analytic pipe 118 can detect and/or otherwise determine a frame freeze condition based on the one or more CRC signatures.

The data processing pipeline 100 of FIG. 1 includes the analytic pipe 118 coupled to the image pipe 114 and the vehicle ECU 110. In FIG. 1, the analytic pipe 118 can correspond to one or more programmable processors, one or more programmable controllers, and/or one or more hardware circuits structured to perform the corresponding operation without executing software or firmware, but other structures are likewise appropriate.

The data processing pipeline 100 includes the analytic pipe 118 to obtain the processed image frame 117 from the image pipe 114 and executes additional computational tasks on the processed image frame 117, such as computer-vision tasks, deep learning tasks (e.g., convolution neural network (CNN) tasks), etc. In some examples, the analytic pipe 118 generates the first output image data 106 based on the processed image frame 117 from the image pipe 114. For example, the first output image data 106 can include and/or otherwise correspond to the processed image frame 117. In other examples, the first output image data 106 can include and/or otherwise correspond to an alert, a notification, etc., indicative of a frame freeze condition associated with the input image data 116. In yet other examples, the first output image data 106 can include and/or otherwise correspond to one or more parameters (e.g., diagnostic parameters, image data statistics, image pipe statistics, etc.) associated with the input image data 116.

The vehicle ECU 110 of FIG. 1 is coupled to the analytic pipe 118. In some examples, the vehicle ECU 110 generates a vehicle command (e.g., adjust a position of a steering wheel, adjust a speed of the vehicle, etc.) based on the first output image data 106. For example, the vehicle ECU 110 can instruct one or more systems of the vehicle to take appropriate action in response to determining that a frame freeze condition has been detection. In FIG. 1, the vehicle ECU 110 can correspond to an embedded controller or system that monitors and/or controls one or more components (e.g., electrical, mechanical, etc.), electrical subsystems, electrical systems, etc. of a vehicle.

The data processing pipeline 100 of FIG. 1 includes the display controller 120 coupled to the image pipe 114 and the display panel 112. In FIG. 1, the display controller 120 can correspond to one or more programmable processors, one or more programmable controllers, and/or one or more hardware circuits structured to perform the corresponding operation without executing software or firmware, but other structures are likewise appropriate.

In some examples, the display controller 120 generates the second output image data 108 based on data from the image pipe 114. For example, the second output image data 108 can correspond to an image rendered by the display controller 120 to be displayed on the display panel 112. For example, the display panel 112 can correspond to a display device (e.g., a light emitting diode (LED) display, an organic light emitting diode (OLED) display, a liquid crystal display (LCD), an in-place switching (IPS) display, a touchscreen, etc.). Alternatively, the vehicle imaging system 102 may include more than one display panel 112. In other examples, the display controller 120 can determine the second output image data 108 to include an alert, a notification, etc., indicative of a frame freeze condition associated with the input image data 116. In such examples, the display controller 120 can instruct the display panel 112 not to display an image or video to a user until the frame freeze condition has been resolved.

Advantageously, by detecting a frame freeze condition in the image pipe 114 compared to a further point in the data processing pipeline 100 (e.g., the analytic pipe 118, the display controller 120, etc.), latency can be reduced from a first example detection time 122 to a second example detection time 124. In FIG. 1, the first detection time 122 can correspond to a first time duration beginning from capturing an image frame by the image data source 104 and ending at displaying the captured image frame at the display panel 112. In FIG. 1, the second detection time 124 can correspond to a second time duration less than the first time duration, where the second time duration begins at capturing the image frame and ends when the image pipe 114 concludes processing the captured image frame. For example, the data processing pipeline 100 of FIG. 1 can detect a frame freeze condition associated with a captured image frame in less time and with reduced computational resources compared to conventional techniques.

Figure 2:
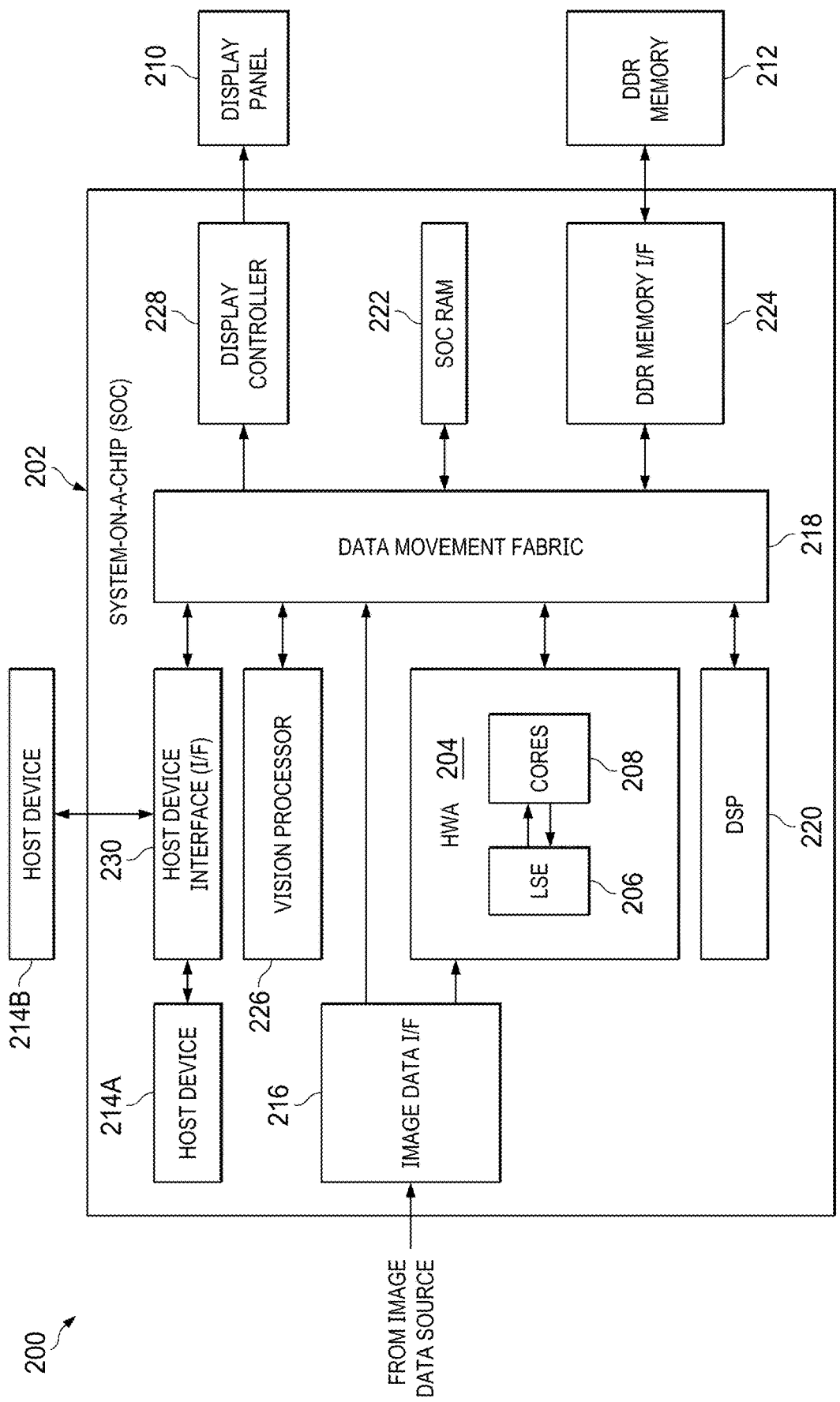
FIG. 2 depicts an example implementation of a system-on-a-chip (SOC) including a hardware accelerator, which includes a load/store engine and cores to detect a freeze of an image frame associated with a vehicle imaging system.

FIG. 2 depicts an example frame freeze detection system 200 to detect a freeze of an image frame associated with a vehicle imaging system. The frame freeze detection system 200 includes an example implementation of a system-on-a-chip (SOC) 202 including an example implementation of a hardware accelerator (HWA) 204, which includes a load/store engine (LSE) 206 and one or more cores 208. The LSE 206 performs and/or otherwise executes data unpacking and packing for the cores 208 and provides other interface data handling functions. For example, the LSE 206 can correspond to an LSE logic circuit, LSE hardware or hardware logic, etc. The cores 208 execute algorithm(s), or core logic, on data processed by the LSE 206. For example, the cores 208 can include one or more cores and/or otherwise correspond to one or more core logic circuits, core hardware or hardware logic etc., to execute the algorithm(s). The SOC 202 of FIG. 2 can correspond to one or more integrated circuits that incorporate components of a computer or other electronic systems in a compact format. For example, the SOC 202 can correspond to a combination of programmable processors, hardware logic, and hardware peripherals and interfaces.

In the illustrated example of FIG. 2, the SOC 202 obtains the input image data 116 of FIG. 1 from the image data source 104 of FIG. 1. In some examples, the SOC 202 instructs an example display panel 210 to display an image rendered by the display controller 228 based on the input image data 116. In some examples, the SOC 202 stores output image data in example double data rate (DDR) memory 212. For example, the DDR memory 212 can be DDR, DDR2, DDR3, DDR4, mobile DDR (mDDR), etc. In some examples, the SOC 202 generates an alert indicative of detecting a frame freeze condition to one or more example host devices 214A-B.

In the illustrated example of FIG. 2, the SOC 202 includes an example image data interface (I/F) 216 coupled to the HWA 204 and an example data movement fabric 218. In some examples, the image data interface 216 obtains the input image data 116 from the image data source 104. The image data interface 216 can correspond to one or more logic circuits to implement a bidirectional interface to obtain the input image data 116. For example, the image data interface 216 can correspond to one or more logic circuits that facilitate operation of and/or otherwise implement an Inter-Inter Circuit (I2C) bus, a universal asynchronous receiver-transmitter (UART) bus, a serial peripheral interface (SPI) bus, etc.

In the illustrated example of FIG. 2, the SOC 202 includes the HWA 204 coupled to the image data interface 216 and the data movement fabric 218. The HWA 204 can correspond to one or more hardware accelerators. For example, the HWA 204 can include and/or otherwise correspond to one or more hardware circuits, hardware logic, hardware implemented state machines, etc., and/or a combination thereof.

In some examples, the HWA 204 obtains image data (e.g., image data parameters, pixel values, etc.) from the image data interface 216 and determines a CRC signature (e.g., a unique CRC signature) for one or more output channels (e.g., output data channels) of the HWA 204. For example, the LSE 206 can obtain the image data and transmit the image data to the cores 208. The cores 208 can calculate and/or otherwise determine image data statistics based on the image data. For example, the cores 208 can determine one or more image data statistics such as a minimum pixel value for a set of pixel values, a maximum pixel value, a sum of pixel values, a sum of squares value, etc., for a set of pixel values. In such examples, the cores 208 can determine the one or more image data statistics based on executing a neighborhood aware pixel transformation (e.g., a census transform, a census transformation, etc.) on the set of pixel values or other image related data. For example, the cores 208 can generate transformed pixel data (e.g., census transformed pixel data) as described below in connection with FIG. 13 based on image data as described below in FIG. 12. The cores 208 can transmit the image data statistics to the LSE 206 on one or more output channels. The LSE 206 can calculate a CRC signature on the one or more output channels. In some examples, the LSE 206 stores the CRC signature(s) in memory included in the LSE 206. In some examples, the LSE 206 transmits the CRC signature(s) to the DDR memory 212 for storage via the data movement fabric 218.

In some examples, the cores 208 determine one or more image data statistics based on image data corresponding to previously obtained and/or otherwise processed image frames. For example, the cores 208 can determine a flow vector or an optical vector for successive image frames. In such examples, the cores 208 can determine (1) a first image data statistic based on a first location of a pixel value in a first image frame and (2) a second image data statistic based on a second location of the pixel value in a second image frame. In some examples, the LSE 206 can determine CRC signature(s) based on the first image data statistic and the second image data statistic. In such examples, the LSE 206, one or both of the host devices 214A-B, etc., can determine how a pixel moved in the second image frame with respect to the first image frame.

In some examples, the cores 208 determine one or more image data statistics based on depth information. For example, the camera 104 of FIG. 1 can be a stereo or stereoscopic camera. In such examples, the cores 208 can determine (1) one or more first image data statistics based on first image data associated with a first image frame captured by the stereo camera at a first time and (2) one or more second image data statistics based on second image data associated with a second image frame captured by the stereo camera at the first time. In some examples, the LSE 206 can determine CRC signature(s) based on the one or more first image data statistics and/or the one or more second image data statistics.

In the illustrated example of FIG. 2, the SOC 202 includes an example digital signal processor (DSP) 220 coupled to the data movement fabric 218. In some examples, the DSP 220 executes tasks and/or otherwise provides support for computer vision processing such as object detection and/or classification.

In the illustrated example of FIG. 2, the SOC 202 includes the data movement fabric 218 to coordinate timing of data transfers between various hardware components of the SOC 202 (e.g., the HWA 204, the image data interface 216, the DSP 220, etc.). In FIG. 2, the data movement fabric 218 is an interconnect. For example, the data movement fabric 218 can include and/or otherwise correspond to a direct memory access (DMA) controller. In other examples, the DMA controller can be external to and/or otherwise coupled to the data movement fabric 218. In some examples, the data movement fabric 218 allows a hardware component of the SOC 202 to access an example SOC random access memory (RAM) 222, the DDR memory 212 via an example DDR memory interface 224, etc.

In the illustrated example of FIG. 2, the SOC RAM 222 is coupled to the data movement fabric 218. The SOC RAM 222 can correspond to volatile memory, such as Synchronous Dynamic Random Access Memory (SDRAM), Dynamic Random Access Memory (DRAM), RAMBUS® Dynamic Random Access Memory (RDRAM®), etc. In FIG. 2, the DDR memory interface 224 is coupled to the data movement fabric 218 and the DDR memory 212. The DDR memory interface 224 can correspond to one or more hardware circuits, logic circuits, etc., to facilitate a bidirectional interface between the data movement fabric 218 and the DDR memory 212.

In the illustrated example of FIG. 2, the SOC 202 includes an example vision processor 226 coupled to the data movement fabric 218. In FIG. 2, the vision processor 226 can correspond to a vector processor tuned for computer vision processing such as gradient computation, orientation binning, histogram normalization, etc.

In the illustrated example of FIG. 2, an example display controller 228 is coupled to the data movement fabric 218 and the display panel 210. The display controller 228 can correspond to the display controller 120 of FIG. 1. The display panel 210 can correspond to the display panel 112 of FIG. 1. For example, the display controller 228 can transmit rendered image data to the display panel 210 to display images on the display panel 210.

In the illustrated example of FIG. 2, the SOC 202 includes a first example host device 214A and an example host device interface 230. In FIG. 2, the host device interface 230 is coupled to the data movement fabric 218 and the first host device 214A. In FIG. 2, a second example host device 214B is external to the SOC 202. In FIG. 2, the second host device 214B is coupled to the SOC 202 via the host device interface 230. The host device interface 230 can correspond to one or more logic circuits to implement a bidirectional interface to facilitate data transfer between the data movement fabric 218 and one or more of the host devices 214A-B. In FIG. 2, one or both of the host devices 214A-B can correspond to one or more programmable processors, one or more programmable controllers, etc.

While an example manner of implementing the SOC 202 is illustrated in FIG. 2, one or more of the elements, processes, and/or devices illustrated in FIG. 2 may be combined, divided, re-arranged, omitted, eliminated, and/or implemented in any other way. Further, the example HWA 204, the example LSE 206, the example cores 208, the example image data interface 216, the example data movement fabric 218, the example DSP 220, the example SOC RAM 222, the example DDR memory interface 224, the example vision processor 226, the example display controller 228, the example host device interface 230, and/or, more generally, the example SOC 202 of FIG. 2 may be implemented by hardware, software, firmware, and/or any combination of hardware, software, and/or firmware. Thus, for example, any of the example HWA 204, the example LSE 206, the example cores 208, the example image data interface 216, the example data movement fabric 218, the example DSP 220, the example SOC RAM 222, the example DDR memory interface 224, the example vision processor 226, the example display controller 228, the example host device interface 230, and/or, more generally, the example SOC 202 could be implemented by one or more analog or digital circuit(s), logic circuits, programmable processor(s), programmable controller(s), graphics processing unit(s) (GPU(s)), DSP(s), ASIC(s), PLD(s), and/or FPLD(s). When reading any of the apparatus or system claims of this patent to cover a purely software and/or firmware implementation, at least one of the example HWA 204, the example LSE 206, the example cores 208, the example image data interface 216, the example data movement fabric 218, the example DSP 220, the example SOC RAM 222, the example DDR memory interface 224, the example vision processor 226, the example display controller 228, and/or the example host device interface 230 is/are hereby expressly defined to include a non-transitory computer readable storage device or storage disk such as non-volatile memory (e.g., read-only memory (ROM), electrically erasable programmable read-only memory (EEPROM), flash memory, etc.), volatile memory (e.g., SDRAM, DRAM, RDRAM®, etc., and/or any other type of RAM device), etc., including the software and/or firmware. Further still, the example SOC 202 of FIG. 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
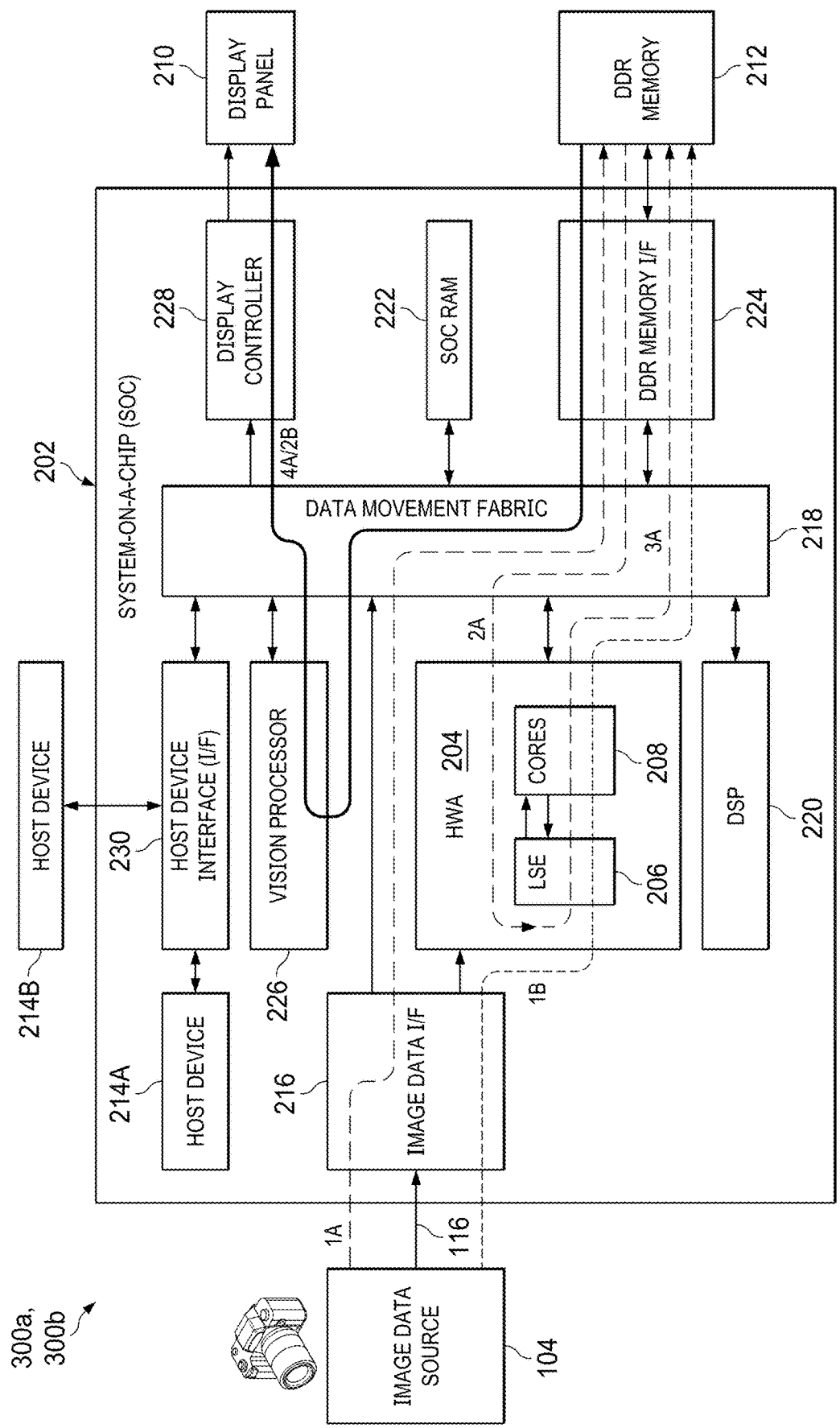
FIG. 3 depicts example workflows associated with the SOC of FIG. 2.

FIG. 3 depicts example workflows 300a, 300b associated with the SOC 202 of FIG. 2. In FIG. 3, the workflows 300a, 300b include a first example workflow 300a and a second example workflow 300b. In FIG. 3, the first workflow 300a corresponds to operations 1A, 2A, 3A, and 4A. In FIG. 3, the second workflow 300b corresponds to operations 1B and 2B.

In the first workflow 300a, during a first operation 1A, the input image data 116 is stored in the DDR memory 212. For example, the image data interface 216 obtains the input image data 116 from the image data source 104. In such examples, the image data interface 216 can (1) process the input image data 116 by extracting raw image data from a transmission layer of data packet(s) transmitting the input image data 116 and (2) transmit the raw image data to the data movement fabric 218. In response, the data movement fabric 218 transmits the raw image data to the DDR memory 212 via the DDR memory interface 224.

In the first workflow 300a, during a second operation 2A, the raw image data is retrieved from the DDR memory 212 by the HWA 204 via the data movement fabric 218 and the DDR memory interface 224. During a third operation 3A of the first workflow 300a, the cores 208 can determine one or more image data statistics and/or transform the raw image data from two-dimensional (2-D) image data into another domain by executing an example transformation operation (e.g., an image data transformation operation) such as a census transform on the raw image data to generate transformed pixel data (e.g., census transform data).

During the third operation 3A, the LSE 206 can determine CRC signature(s) based on at least one of (1) the raw image data, (2) the one or more image data statistics, or (3) the transformed pixel data. For example, the LSE 206 can determine a CRC signature value for the raw image data, respective ones of the one or more image data statistics, and/or the transformed pixel data. During the third operation 3A, the HWA 204 transmits the raw image data, the one or more image data statistics, the transformed pixel data, and/or the CRC signature value(s) to the data movement fabric 218. During the third operation 3A, the data movement fabric 218 transmits the raw image data, the one or more image data statistics, the transformed pixel data, and/or the CRC signature value(s) to the DDR memory 212 via the DDR memory interface 224. Alternatively, the data movement fabric 218 may transmit the raw image data, the one or more image data statistics, the transformed pixel data, and/or the CRC signature value(s) to one or both of the host devices 214A-B via the host device interface 230. For example, one or both of the host devices 214A-B can detect a frame freeze condition based on the CRC signature value(s) and/or the one or more image data statistics. In such examples, one or both of the host devices 214A-B can detect the frame freeze condition based on the CRC signature value(s) and/or the one or more image data statistics for two successive or sequential image frames. Alternatively, one or both of the host devices 214A-B may obtain the CRC signature value(s) and/or the one or more image data statistics from the DDR memory 212 via the host device interface 230, the data movement fabric 218, and the DDR memory interface 224.

In the first workflow 300a, during a fourth operation 4A, the raw image data from the DDR memory 212 is transmitted to the display panel 210 via the DDR memory interface 224, the data movement fabric 218, and the display controller 228. For example, the display panel 210 can display one or more image frames captured by the image data source 104 and rendered by the display controller 228.

In the second workflow 300b, during a first operation 1B, the input image data 116 is processed by the HWA 204 prior to being stored in the DDR memory 212. For example, the image data interface 216 can obtain the input image data 116, extract raw image data from the input image data 116, and process the raw image data to generate processed image data. During the first operation 1B, the HWA 204 can instruct the cores 208 to determine one or more image data statistics and/or transform the processed image data from 2-D image data into another domain by executing an example transformation operation such as a neighborhood aware pixel transformation to generate transformed pixel data.

During the first operation 1B, the HWA 204 can instruct the LSE 206 to determine CRC signature(s) on at least one of (1) the processed image data, (2) the one or more image data statistics, or (3) the transformed pixel data. The HWA 204 can transmit the processed image data, the one or more image data statistics, the transformed pixel data, and/or the CRC signature value(s) to the DDR memory 212 via the data movement fabric 218 and the DDR memory interface 224. In some examples, the LSE 206 can store the CRC signature(s) in the LSE 206 and can detect a frame freeze condition by comparing the CRC signature(s) to previously generated and/or stored CRC signature(s) (e.g., CRC signature(s) previously generated by the LSE 206, CRC signature(s) previously stored in the LSE 206, etc.). Advantageously, the second workflow 300b decreases a detection time of a frame freeze condition by determining the image data statistic(s) and/or the CRC signature value(s) at a front end of the SOC 202 before storing the input image data 116 in the DDR memory 212 compared to the first workflow 300a of FIG. 3.

Figure 4:
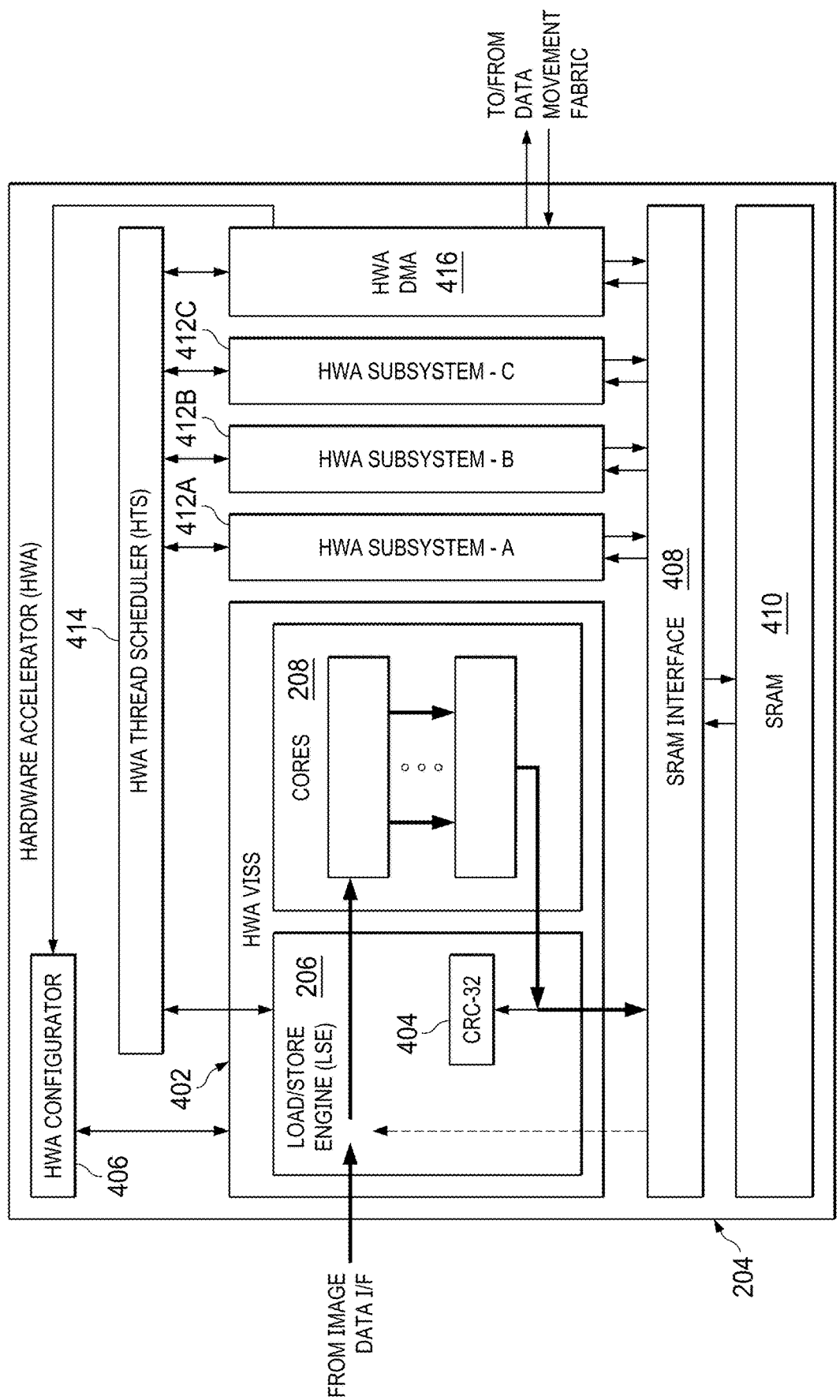
FIG. 4 depicts an example implementation of the hardware accelerator of FIG. 2.

FIG. 4 depicts an example implementation of the HWA 204 of FIGS. 2-3. The HWA 204 includes an example HWA VISS 402, which includes the LSE 206 and the cores 208. The HWA VISS 402 is a subsystem (e.g., one or more hardware and/or logic circuits) of the HWA 204 configured to execute visual imaging processing related computations and/or computing tasks.

The HWA VISS 402 of FIG. 4 includes the LSE 206 of FIGS. 2-3 to obtain input image data from the image data interface 216 of FIGS. 2-3. The HWA VISS 402 of FIG. 4 includes the cores 208 to obtain the input image data from the LSE 206. The cores 208 calculate and/or otherwise determine parameters such as image data statistic(s). The cores 208 can transmit the image data statistic(s) to the LSE 206 to invoke the LSE 206 to calculate and/or otherwise determine a CRC signature value for each of the image data statistic(s).

The LSE 206 of FIG. 4 includes example CRC logic circuit(s) 404 to determine a CRC signature value for one or more output channels of the LSE 206. For example, the CRC logic circuit(s) 404 can calculate a first CRC signature value on a first output channel transmitting processed image data, a second CRC signature value on a second output channel transmitting an image data statistic, a third CRC signature value on a third output channel transmitting transformed pixel data, etc., and/or a combination thereof. In FIG. 4, the CRC logic circuit(s) 404 determine CRC signature values having a data size of 32 bits. Alternatively, the CRC logic circuit(s) 404 may determine the CRC signature values to have any other data size. In some examples, the CRC logic circuit(s) 404 can determine a 32-bit CRC signature value based on the following 32-bit CRC polynomial:

$x^{32}+x^{26}+x^{23}+x^{22}+x^{16}+x^{12}+x^{11}+x^{10}+x^{8}+x^{7}+x^{5}+x^{4}+x^{2}+x+1$. Alternatively, any other CRC polynomial may be used.

In some examples, the CRC logic circuit(s) 404 can update and store the CRC signature values until an entire image frame has been processed. In response to the entire image frame being processed, the CRC logic circuit(s) 404 can store the CRC signature values in the SRAM 410 via the SRAM interface 408. In some examples, the host devices 214A-B of FIGS. 2-3 obtain the CRC signature values from the SRAM 410 via the SRAM interface 408, the HWA DMA 416, the data movement fabric 218 of FIGS. 2-3, and the host device interface 230 of FIGS. 2-3.

The CRC logic circuit(s) 404 of FIG. 4 can determine a CRC signature value for a first image frame and, in some examples, can compare the CRC signature value to a previously calculated CRC signature value for a second image frame, or a previous image frame. A frame freeze detection condition can be detected when the CRC signature value is the same as the previously calculated CRC signature value, which is indicative of an error in software, hardware, and/or firmware associated with capturing and/or processing images from the image data source 104 of FIGS. 1-3.

In the illustrated example of FIG. 4, the HWA 204 includes an example HWA configurator 406 coupled to the HWA VISS 402. Alternatively, the HWA 204 may not include the HWA configurator 406. For example, the HWA 204 may be coupled to the HWA configurator 406.

In some examples, the HWA configurator 406 configures the LSE 206 to calculate and/or otherwise compute a CRC value on one or more output channels of the LSE 206. For example, the HWA configurator 406 can configure the LSE 206 by selecting one or more of the output channels for CRC calculation. In some examples, the one or more output channels correspond to processed image data channels. For example, the one or more output channels can include a first output channel corresponding to luma data, a second output channel corresponding to chrominance, or chroma data, a third output channel corresponding to RBG data, etc., where one or more of the output channels have a data size of 8 bytes, 12 bytes, etc.

In some examples, the HWA configurator 406 configures the cores 208 to calculate and/or otherwise compute one or more types of image data statistics. For example, the HWA configurator 406 can configure a first core of the cores 208 to calculate a first image data statistic corresponding to a maximum value for a set of pixels (e.g., the maximum value being greatest in value). In other examples, the HWA configurator 406 can configure a second core of the cores 208 to determine a second image data statistic corresponding to a minimum value for a set of pixel values (e.g., the minimum value being least in value). In some examples, the hardware configurator 406 can configure at least one of the LSE 206 or the cores 208 based on a command, a configuration, an instruction, etc., from the host devices 214A-B of FIGS. 2-3.

In the illustrated example of FIG. 4, the HWA 204 includes an example static RAM (SRAM) interface 408 coupled to the HWA VISS 402 and example SRAM 410. In FIG. 4, the SRAM 410 can correspond to one or more SRAM devices. Alternatively, the SRAM 410 may be any other type of memory. In FIG. 4, the SRAM interface 408 can correspond to one or more logic circuits to implement a bidirectional interface to facilitate a reading and/or writing of data to the SRAM 410. For example, the SRAM interface 408 can correspond to one or more logic circuits that facilitate operation of and/or otherwise implement a memory controller.

In the illustrated example of FIG. 4, the HWA 204 includes example HWA subsystems 412A-C including HWA SUBSYSTEM-A, HWA SUBSYSTEM-B, and HWA SUB-SYSTEM-C. In some examples, the HWA subsystems 412A-C are copies or instances of the HWA VISS 402. In some examples, one or more of the HWA subsystems 412A-C are different from different ones of the HWA subsystems 412A-C. For example, one or more of the HWA subsystems 412A-C can include the LSE 206 and the cores 208 of the HWA VISS 402. Alternatively, one or more of the HWA subsystems 412A-C may be different from the HWA VISS 402. For example, one or more of the HWA subsystems 412A-C can perform and/or otherwise execute image processing related functions, such as scaling, distortion correction, etc.

The HWA subsystems 412A-C are each coupled to the SRAM interface 408 and an example HWA thread scheduler (HTS) 414. The HTS 414 controls data flow scheduling between the HWA subsystems 412A-C and from/to external memory for the HWA subsystems 412A-C. For example, the HTS 414 can manage a set of state machines for each of the HWA subsystems 412A-C and coordinates data processing/transfer scheduling in the HWA subsystems 412A-C via dedicated start/done signals. For example, the HTS 414 can perform and/or otherwise facilitate start/done task synchronization signal handling programmable done-mask generation schemes, end of processing (EOP) generation, and/or debug ready status signal generation for debug/halt status.

Further depicted as being included in the HWA 204 of FIG. 4 is a HWA DMA 416 coupled to the SRAM interface 408, the HTS 414, and the data movement fabric 218 of FIGS. 2-3. In FIG. 4, the HWA DMA 416 can correspond to one or more hardware circuits, logic circuits, etc., to facilitate a bidirectional interface between the data movement fabric 218 of FIGS. 2-3, the HTS 414, and/or the SRAM interface 408.

Figure 5:
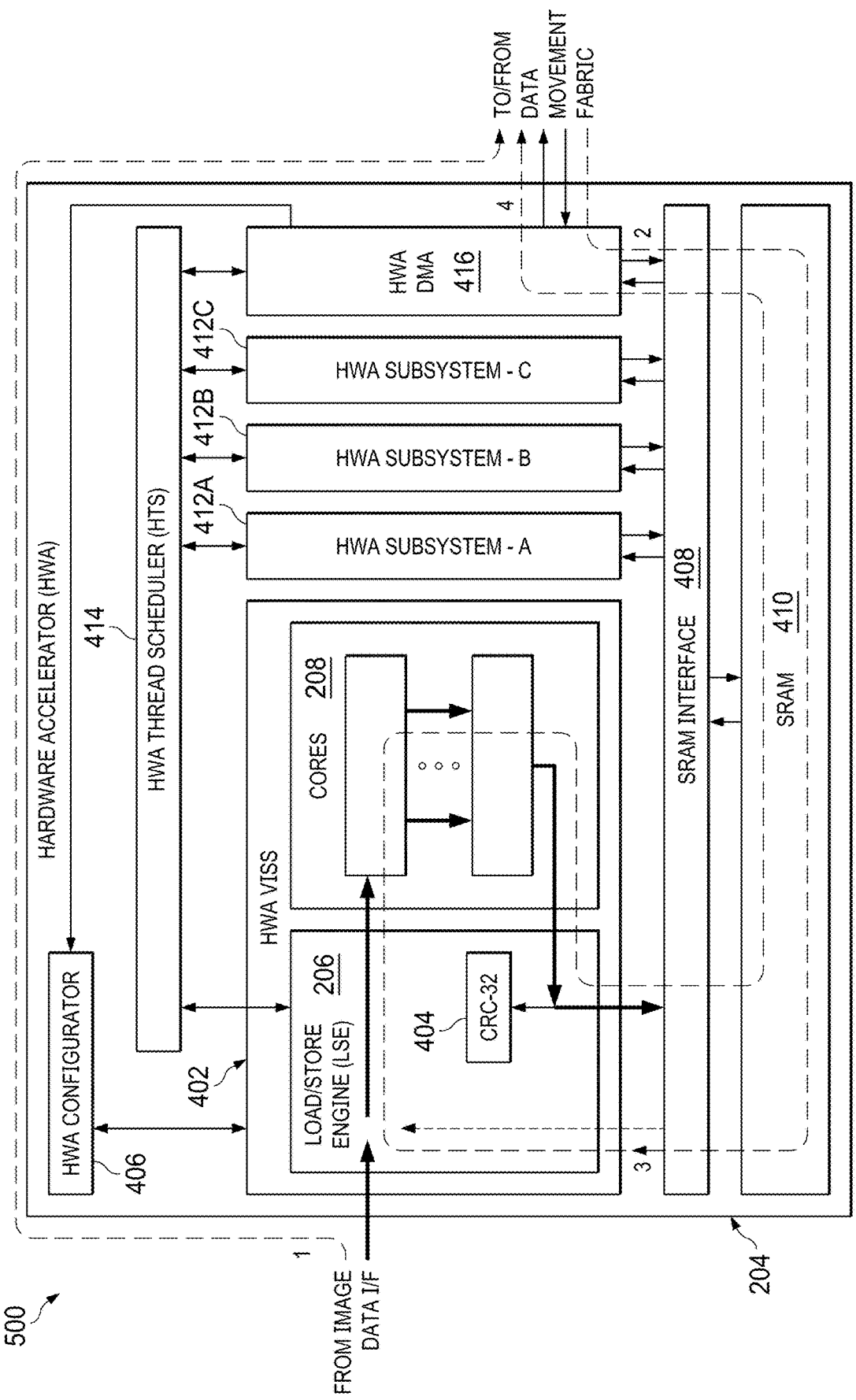
FIG. 5 depicts an example workflow associated with the example implementation of the hardware accelerator of FIG. 4.

FIG. 5 depicts an example workflow 500 associated with the example implementation of the HWA 204 of FIG. 4. The workflow 500 of FIG. 5 can correspond to the first workflow 300a of FIG. 3. In FIG. 5, the workflow 500 corresponds to operations 1-4 including a first operation (1), a second operation (2), a third operation (3), and a fourth operation (4).

The workflow 500 of FIG. 5 begins with the first operation, where data from the image data interface 216 of FIGS. 2-3 is transmitted to the DDR memory 212 of FIGS. 2-3 via the data movement fabric 218 of FIGS. 2-3. During the second operation, data is retrieved from the DDR memory 212 via the data movement fabric 218. For example, the HWA DMA 416 of FIG. 4 can obtain the image data from the data movement fabric 218 and store the obtained image data in the SRAM 410.

In the illustrated example of FIG. 5, during the third operation, the image data stored in the SRAM 410 is obtained by the LSE 206 of FIGS. 2-4. The LSE 206 transmits the image data to the cores 208 for processing. For example, the cores 208 can generate processed image data, transformed pixel data, and/or image data statistic(s) based on the image data. In such examples, the cores 208 can transmit the processed image data, the transformed pixel data, and/or the image data statistic(s) to output channel(s) of the LSE 206. The LSE 206 can invoke the CRC logic circuit(s) 404 to calculate CRC signature value(s) based on the processed image data, the transformed pixel data, and/or the image data statistic(s). The CRC logic circuit(s) 404 can update (e.g., iteratively update) the CRC signature value as updated values from the cores 208 are received. In response to processing an entire image frame, the cores 208 can notify the LSE 206 (e.g., by generating and transmitting an end signal to the LSE 206, transmitting an end bit to the LSE 206, etc.) that the entire image frame has been processed.

In FIG. 5, after obtaining the notification, the CRC logic circuit(s) 404 can store and/or otherwise retain a final or last value of the CRC signature in the LSE 206. For example, the LSE 206 can store the final or last value of the CRC signature in a memory-mapped register, a flip-flop, etc. In some examples, after obtaining the notification, the CRC logic circuit(s) 404 can transmit the final or last value of the CRC signature to the SRAM interface 408 to store the final or last value of the CRC signature in the SRAM 410. For example, the final or last value of the CRC signature can be transmitted to one or both of the host devices 214A-B of FIGS. 2-3 from the SRAM 410 via a data path that includes at least the SRAM interface 408 and the HWA DMA 416.

Figure 6:
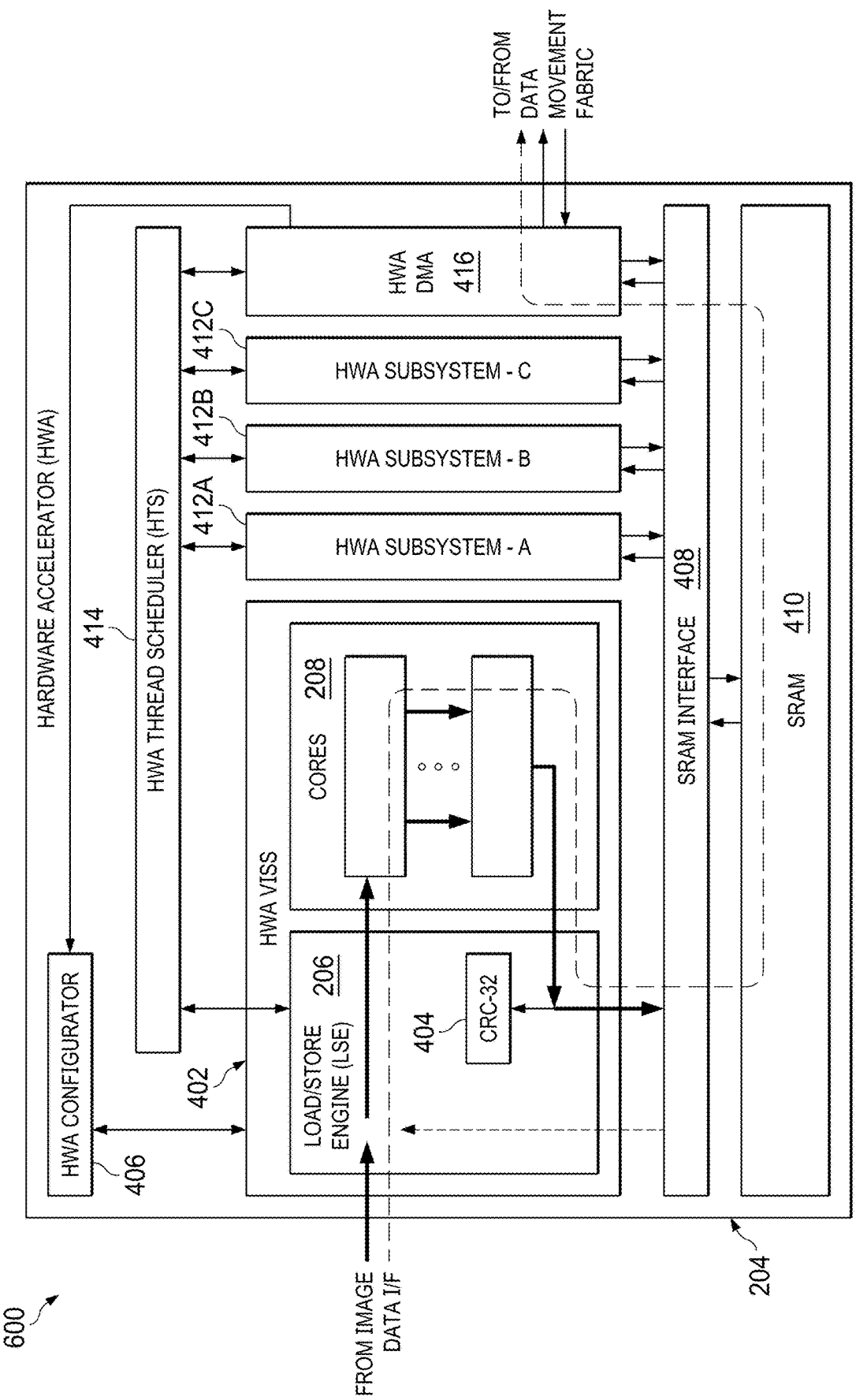
FIG. 6 depicts another example workflow associated with the example implementation of the hardware accelerator of FIG. 4.

FIG. 6 depicts an example workflow 600 associated with the example implementation of the HWA 204 of FIG. 4. The workflow 600 of FIG. 6 can correspond to the second workflow 300b of FIG. 3. In FIG. 6, the workflow 600 begins when the LSE 206 obtains input image data from the image data interface 216 of FIGS. 2-3. Advantageously, by obtaining the input image data from the image data interface 216 instead of from the DDR memory 212 as described above in connection with FIG. 5, a detection time of image frame freeze can be reduced. For example, the first and second operations of the workflow 500 of FIG. 5 can be eliminated, which reduces latency and, thus, reduces a time to detect an image frame freeze condition.

In the illustrated example of FIG. 6, the LSE 206 transmits the received image data to the cores 208 for processing and receives the processed image data, the transformed pixel data, and/or the image data statistic(s) from the cores 208 as described above in connection with FIG. 5. Accordingly, the CRC logic circuit(s) 404 can store a final or last value of the CRC signature(s) based on the processed image data, the transformed pixel data, and/or the image data statistic(s) in the LSE 206. Alternatively, the final or last value of the CRC signature(s) can be stored in the SRAM 410 and transmitted to one or both of the host devices 214A-B of FIGS. 2-3 from the SRAM 410 via a data path that includes at least the SRAM interface 408 and the HWA DMA 416.

Figure 7:
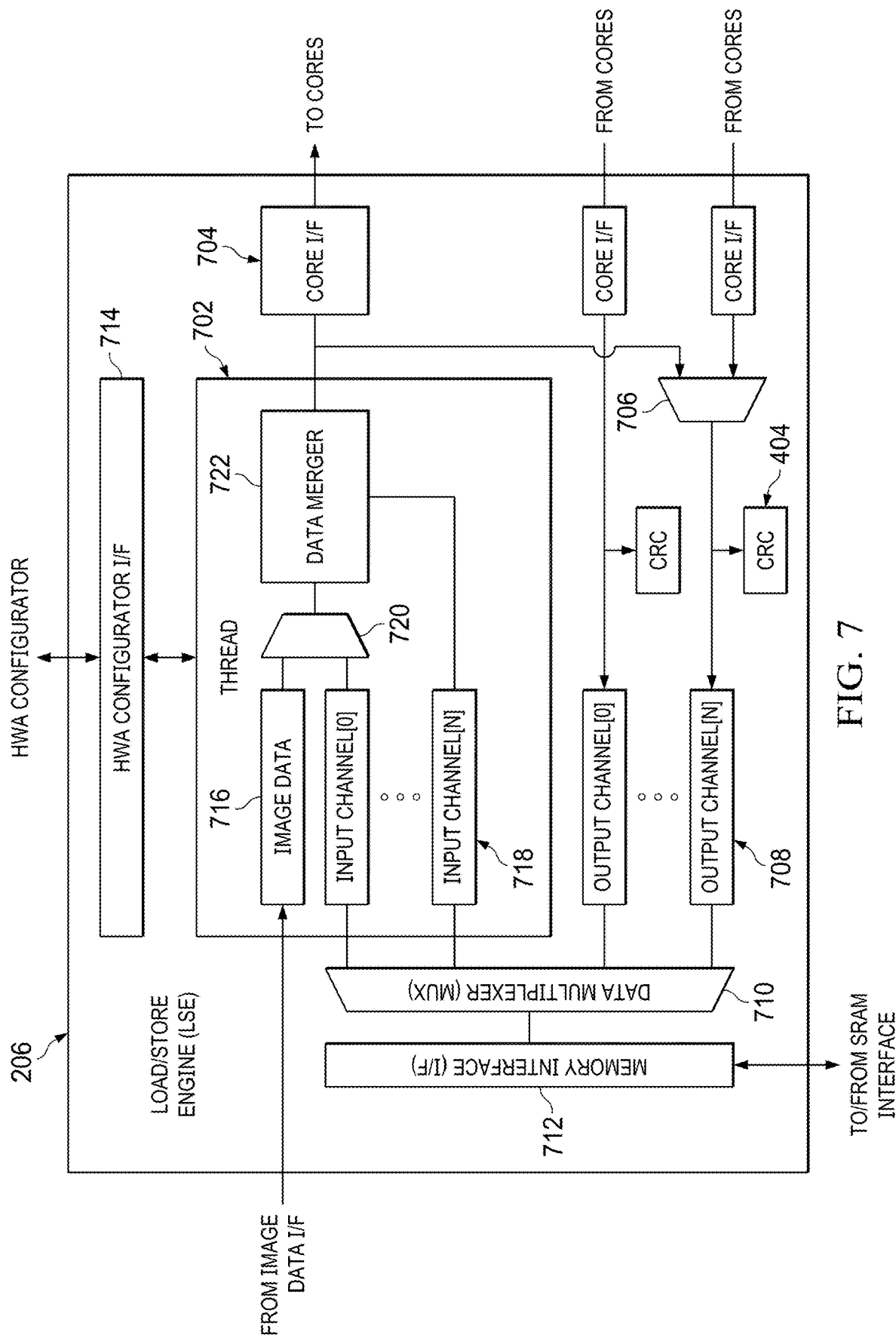
FIG. 7 depicts an example implementation of the load/store engine of FIG. 2.

FIG. 7 depicts an example implementation of the LSE 206 of FIGS. 2-6. In FIG. 7, the LSE 206 includes an example thread 702, example core interfaces 704, an example output channel multiplexer 706, example output channels 708, an example data multiplexer (MUX) 710, an example memory interface 712, and an example HWA configurator interface 714. Further depicted in FIG. 7 are the CRC logic circuit(s) 404 of FIGS. 4-6.

In the illustrated example of FIG. 7, the thread 702 obtains image data from the image data interface 216 of FIGS. 2-3 and/or the memory interface 712. For example, the thread 702 can obtain image data from the DDR memory 212 of FIG. 2 via the memory interface 712. In FIG. 7, the thread 702 is a processing thread, a HWA thread, a logic circuit thread, etc., that corresponds to a processing chain with its own HTS start/done. For example, the thread 702 can be a logical construct representative of a hardware and/or software processing thread and may not be a physical entity. Alternatively, the LSE 206 may include more than one of the thread 702. In some examples, the thread 702 executes a series of hardware logic operations beginning with a start signal and ending with a done signal.

In the illustrated example of FIG. 7, the thread 702 includes an example image data buffer 716, example input channels 718, an example input channel multiplexer 720, and an example data merger 722. The image data buffer 716 is a data buffer that stores image data from the image data interface 216 of FIGS. 2-3. For example, the LSE 206 can obtain substantially real-time image data from the image data source 104 of FIGS. 1-3 via the image data buffer 716.

In the illustrated example of FIG. 7, the input channels 718 correspond to two or more data channels that facilitate a reading of and/or an unpacking of image data (e.g., pixel data, pixel values, etc.) obtained from the SRAM 410 of FIGS. 4-6 that can be later transmitted to the cores 208 of FIGS. 2-6 via one of the core interfaces 704 for processing. Alternatively, the thread 702 may only have one of the input channels 718 or may only have one of the input channels 718 that are configured to read image data.

In the illustrated example of FIG. 7, the image data buffer 716 and a first input channel (INPUT CHANNEL[0]) of the input channels 718 are coupled to the input channel multiplexer 720. In FIG. 7, the image data buffer 716 is coupled to a first input of the input channel multiplexer 720. In FIG. 7, the first input channel of the input channels 718 is coupled to a second input of the input channel multiplexer 720. In some examples, the input channel multiplexer 720 determines whether to transmit to the cores 208 either (1) the stored image data from the SRAM 420 or (2) the substantially real-time image data obtained by and/or stored by the image data buffer 716. In some examples, the input channel multiplexer 720 can determine to transmit the stored image data from the SRAM 420 to the cores 208, which can correspond to the first workflow 300a of FIG. 3. In some examples, the input channel multiplexer 720 can determine to transmit the substantially real-time image data obtained by and/or stored by the image data buffer 716 to the cores 208, which can correspond to the second workflow 300b of FIG. 3.

In the illustrated example of FIG. 7, the input channel multiplexer 720 and a second input channel (INPUT CHANNEL[N]) of the input channels 718 are coupled to the data merger 722. In FIG. 7, an output of the input channel multiplexer 720 is coupled to a first input of the data merger 722. In FIG. 7, an output of the second input channel of the input channels 718 is coupled to a second input of the data merger 722. The data merger 722 can correspond to one or more logic circuits that arrange and/or otherwise format image data into a format that can be read and/or otherwise obtained by the cores 208. For example, the data merger 722 can correspond to a first-in first-out (FIFO) data buffer that can synchronize an exchange and/or transmission of data with the cores 208. In other examples, the data merger 722 can append or remove data bits, data headers, etc., to image data to facilitate acceptance of the image data by the cores 208.

In the illustrated example of FIG. 7, the data merger 722 is coupled to a first core interface of the core interfaces 704 and a first input of the output channel multiplexer 706. In FIG. 7, a second core interface of the core interfaces 704 is coupled to a first output channel (OUTPUT CHANNEL [0]) of the output channels 708 and a first CRC logic circuit of the CRC logic circuits 404. In FIG. 7, a third core interface of the core interfaces 704 is coupled to a second input of the output channel multiplexer 706. An output of the output channel multiplexer 706 is coupled to a second output channel (OUTPUT CHANNEL[N]) of the output channels 708 and a second CRC logic circuit of the CRC logic circuits 404. Alternatively, the second and third core interfaces of the core interfaces 704 may be uncorrelated with the first and second output channels of the output channels 708. For example, the second core interface of the core interfaces 704 can be coupled to the first output channel of the output channels 708 and the second input of the output channel multiplexer 706.

In the illustrated example of FIG. 7, the core interfaces 704 can correspond to one or more logic circuits to implement a bidirectional interface to transmit data to and/or receive data from the cores 208. For example, the core interfaces 704 can correspond to one or more logic circuits that facilitate operation of and/or otherwise implement an Inter-Inter Circuit (I2C) bus, a universal asynchronous receiver-transmitter (UART) bus, a serial peripheral interface (SPI) bus, etc.

In the illustrated example of FIG. 7, the data multiplexer 710 is coupled to the input channels 718, the output channels 708, and the memory interface 712. The data multiplexer 710 synchronizes and/or otherwise facilitates image data processing operations of the LSE 206. For example, the data multiplexer 710 can invoke the memory interface 712 to obtain image data from the SRAM 420 to provide to the thread 702 to process. In other examples, the data multiplexer 710 can invoke the memory interface 712 to store processed data (e.g., CRC signature values, image data statistics, etc.) in the SRAM 420.

In the illustrated example of FIG. 7, the HWA configurator interface 714 facilitates communication between the LSE 206 and the HWA configurator 406 of FIGS. 4-6. For example, the HWA configurator interface 714 can obtain configuration information from the HWA configurator 406 to configure and/or otherwise adjust operation of the thread 702. In such examples, the thread 702 can enable or disable one or more of the input channels 718 based on the configuration information. In other examples, the thread 702 can invoke the input channel multiplexer 720 to select data from either of the image data buffer 716 or one of the input channels 718.

Figure 8:
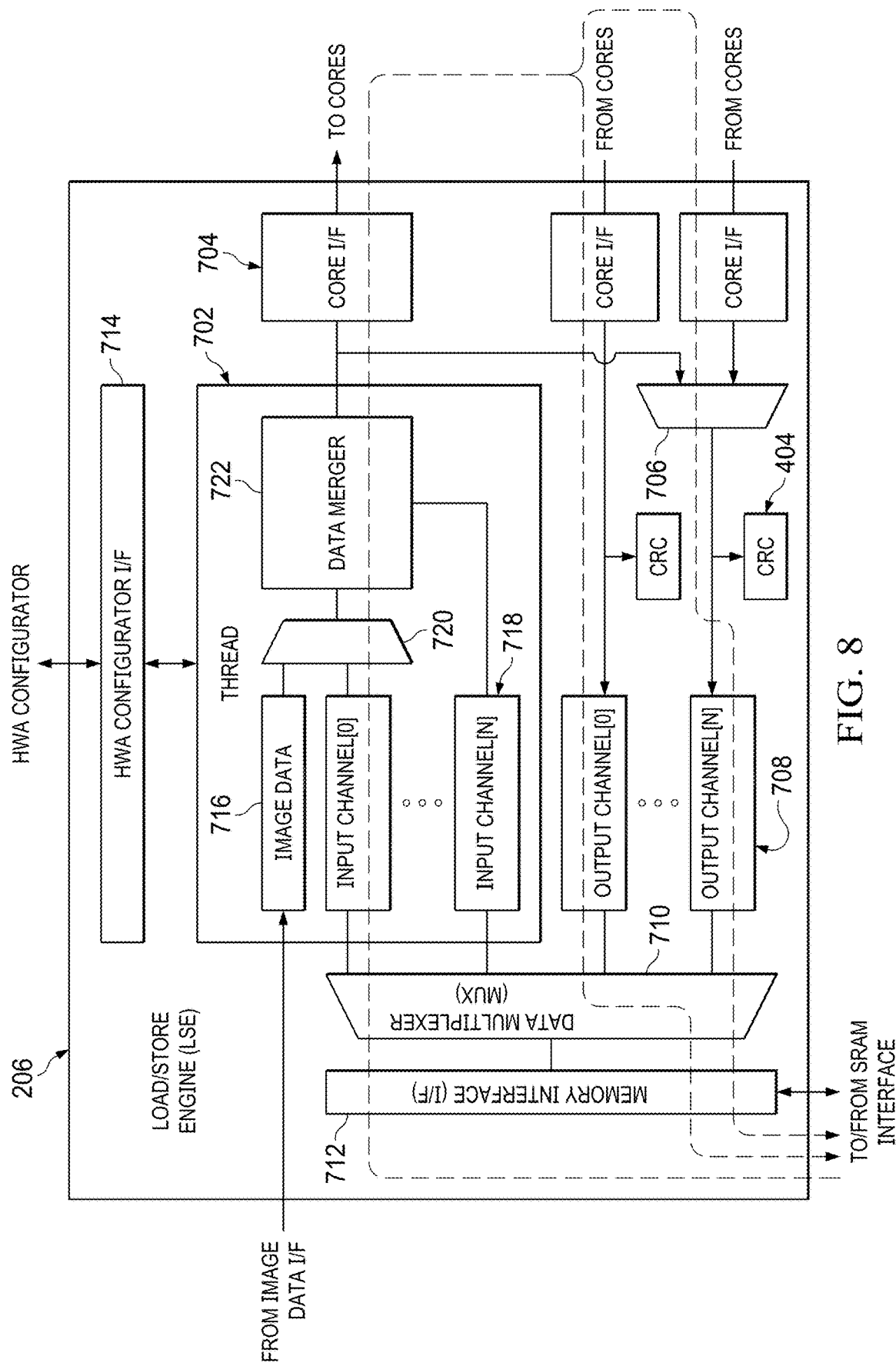
FIG. 8 depicts an example workflow associated with the example implementation of the load/store engine of FIG. 7.

FIG. 8 depicts an example workflow 800 associated with the example implementation of the LSE 206 of FIG. 7. The workflow 800 of FIG. 8 can correspond to the first workflow 300a of FIG. 3. In FIG. 8, the LSE 206 obtains image data from the SRAM 410 of FIGS. 4-6 via the SRAM interface 408 of FIGS. 4-6. For example, the memory interface 712 of FIG. 7 can obtain and transmit the image data to the thread 702 of FIG. 7. The thread 702 can unpack the image data and format the unpacked image data into a format that can be processed by the cores 208 of FIGS. 2-6. The cores 208 can obtain the image data from the LSE 206 via the first one of the core interfaces 704. The cores 208 can generate processed image data, transformed pixel data, and/or image data statistic(s) based on the image data. The cores can transmit the processed image data, the transformed pixel data, and/or the image data statistic(s) to the LSE 206 via the second one of the core interfaces 704, the third one of the core interfaces 704, etc. The core interfaces 704 can transmit the processed image data, the transformed pixel data, and/or the image data statistic(s) to one or more of the output channels 708.

In the illustrated example of FIG. 8, one or more of the CRC logic circuits 404 calculate a CRC signature value on a corresponding output channel. For example, the CRC logic circuits 404 can calculate the CRC signature values prior to and/or substantially in parallel with the output channels 708 receiving data from the cores 208. In such examples, the CRC logic circuits 404 can calculate a first CRC signature value on the processed image data transmitted to OUTPUT CHANNEL[0], a second CRC signature value on the transformed pixel data transmitted to OUTPUT CHANNEL[1], a third CRC signature value on a first image data statistic transmitted to OUTPUT CHANNEL[2], a fourth CRC signature value on a Nth image data statistic transmitted to OUTPUT CHANNEL[N], etc., and/or a combination thereof. In response to obtaining the processed image data, the transformed pixel data, and/or the image data statistic(s), the one or more output channels 708 can transmit the processed image data, the transformed pixel data, and/or the image data statistic(s) to the SRAM 410 via a data path including the data multiplexer 710 and the memory interface 712. In some examples, the input channel multiplexer 720, the output channel multiplexer 706, etc., and/or a combination thereof may be configured, enabled, etc., to bypass the obtaining of image data from the image data interface 216 of FIG. 2. In such examples, the CRC logic circuits 404 can execute on input image data (e.g., raw input image data) from the image data interface 216.

Figure 9:
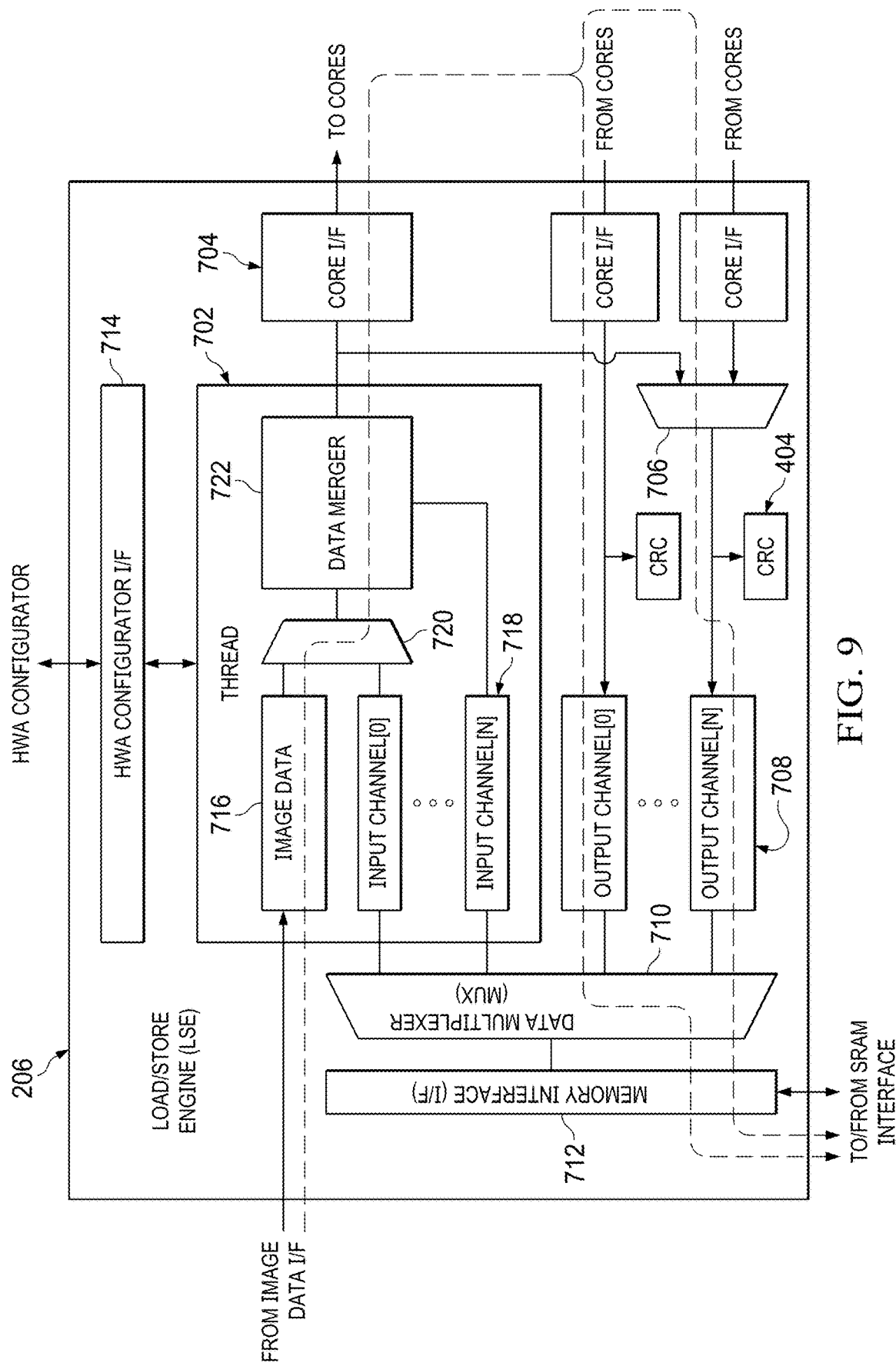
FIG. 9 depicts another example workflow associated with the example implementation of the load/store engine of FIG. 7.

FIG. 9 depicts an example workflow 900 associated with the example implementation of the LSE 206 of FIG. 7. The workflow 900 of FIG. 9 can correspond to the second workflow 300b of FIG. 3. In FIG. 9, the LSE 206 obtains image data from the image data interface 216 of FIGS. 2-3 prior to the image data being stored in the SRAM 410 of FIGS. 4-6. For example, the image data buffer 716 can obtain the image data rather than INPUT CHANNEL[0] as described above in connection with FIG. 8. The LSE 206 can calculate CRC signature values based on processed image data, transformed pixel data, and/or image data statistic(s) determined by the cores 208 of FIGS. 2-6 as described above in connection with FIG. 8. Advantageously, by obtaining the image data from the image data interface 216 instead of from the SRAM 410 as described above in connection with FIG. 8, a time to detect an image frame freeze condition can be reduced as the LSE 206 can process image data earlier in the image data processing pipeline compared to other workflows described herein.

Figure 10:
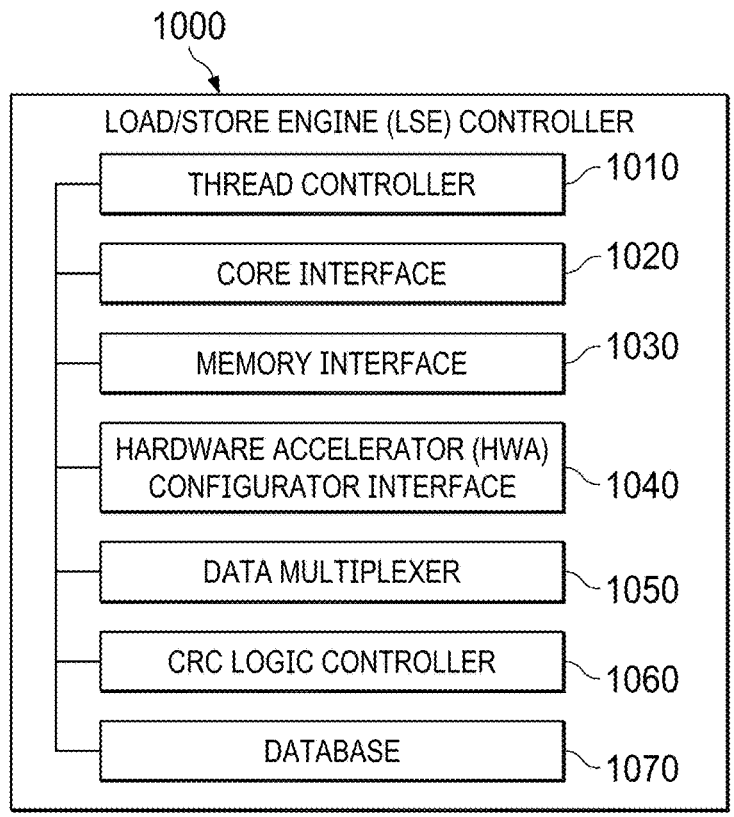
FIG. 10 depicts another example implementation of the load/store engine of FIG. 2.

FIG. 10 depicts an example implementation of an LSE controller 1000. The LSE controller 1000 of FIG. 10 can correspond to another example implementation of the LSE 206 of FIG. 2. In the illustrated example of FIG. 10, the LSE controller 1000 includes an example thread controller 1010, an example core interface 1020, an example memory interface 1030, an example HWA configurator interface 1040, an example data multiplexer 1050, an example CRC logic controller 1060, and an example database 1070.

In the illustrated example of FIG. 10, the LSE controller 1000 includes the thread controller 1010 to synchronize an exchange and/or transmission of data with a different device, controller, and/or control logic. In some examples, the thread controller 1010 obtains image data (e.g., the input image data 116 of FIG. 1, image data or processed image data from the image data interface 216 of FIG. 2, etc.) captured by and/or otherwise obtained from an image data source (e.g., the image data source 104 of FIG. 1).

In some examples, the thread controller 1010 arranges and/or otherwise formats image data into a format that can be read and/or otherwise be obtained by an example core controller 1100 described below in connection with FIG. 11. For example, the thread controller 1010 can append or remove data bits, data headers, etc., to image data to facilitate acceptance of the image data by the different controller and/or control logic. In some examples, the thread controller 1010 corresponds to and/or otherwise implements the image data buffer 716, one or more of the input channels 718, the input channel multiplexer 720, and/or the data merger 722 of FIG. 7.

Figure 11:
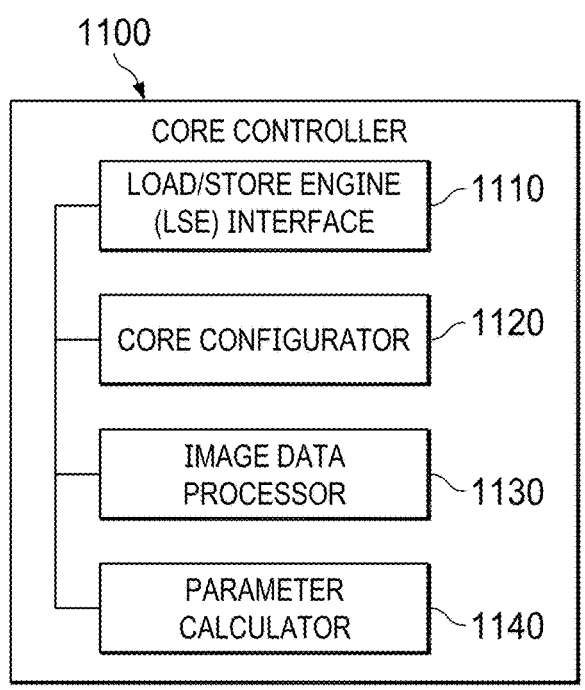
FIG. 11 depicts an example implementation of the cores of FIG. 2.

In the illustrated example of FIG. 10, the LSE controller 1000 includes the core interface 1020 to transmit data to and/or receive data from a different controller and/or control logic, such as the cores 208 of FIG. 2, the core controller 1100 of FIG. 11, etc. In some examples, the core interface 1020 pre-processes, formats, converts, and/or otherwise translates data from a first data format used by the LSE controller 1000 to a second data format different from the first data format prior to transmission. In some examples, the core interface 1020 translates received data in the second data format from the different controller and/or control logic to the first data format. In some examples, the core interface 1020 corresponds to and/or otherwise implements one or more of the core interfaces 704 of FIG. 7.

In the illustrated example of FIG. 10, the LSE controller 1000 includes the memory interface 1030 to read data from and/or write data to memory or other storage device. In some examples, the memory interface 1030 is a memory controller that, when invoked, can facilitate transfer of data between memory and the LSE controller 1000. In some examples, the memory interface 1030 corresponds to and/or otherwise implements the memory interface 712 of FIG. 7.

In the illustrated example of FIG. 10, the LSE controller 1000 includes the HWA configurator interface 1040 to obtain configuration information to configure the LSE controller 1000. In some examples, the HWA configurator interface 1040 can configure the thread controller 1010 to obtain image data from a specified source (e.g., from memory, an image data source, etc.) based on the configuration information. In some examples, the HWA configurator interface 1040 obtains the configuration information from the HWA configurator 406 of FIG. 4, one or both of the host devices 214A-B of FIG. 2, etc. In some examples, the HWA configurator interface 1040 corresponds to and/or otherwise implements the HWA configurator interface 714 of FIG. 7.

In the illustrated example of FIG. 10, the LSE controller 1000 includes the data multiplexer 1050 to control read and/or write data operations. In some examples, the data multiplexer 1050 selects a source to obtain image data based on configuration information obtained by the HWA configurator interface 1040. In some examples, the data multiplexer 1050 corresponds to and/or otherwise implements the data multiplexer 710 of FIG. 7.

In the illustrated example of FIG. 10, the LSE controller 1000 includes the CRC logic controller 1060 to calculate and/or otherwise determine a CRC signature (e.g., a 32-bit CRC signature based on the 32-bit CRC polynomial described above). For example, the CRC logic controller 1060 can calculate a CRC signature based on processed image data generated by the cores 208, transformed pixel data generated by the cores 208, an image data statistic parameter determined by the cores 208, etc. In some examples, the CRC logic controller 1060 compares CRC signature values to detect an image frame freeze condition. For example, the CRC logic controller 1060 can detect an image frame freeze condition in response to determining a difference between CRC signature values. In some examples, the CRC logic controller 1060 corresponds to and/or otherwise implements the CRC logic circuit(s) 404 of FIGS. 4-9.

In the illustrated example of FIG. 10, the LSE controller 1000 includes the database 1070 to record data (e.g., configuration information, image data statistics, CRC signature values, etc.). The database 1070 may be implemented by a volatile memory (e.g., a SDRAM, DRAM, RDRAM®, etc.) and/or a non-volatile memory (e.g., ROM, EEPROM, flash memory, etc.). The database 1070 may additionally or alternatively be implemented by one or more DDR memories, such as DDR, DDR2, DDR3, DDR4, mDDR, etc. The database 1070 may additionally or alternatively be implemented by one or more mass storage devices such as hard disk drive(s), compact disk drive(s), digital versatile disk drive(s), solid-state disk drive(s), etc. While in the illustrated example the database 1070 is illustrated as a single database, the database 1070 may be implemented by any number and/or type(s) of databases. Furthermore, the data stored in the database 1070 may be in any data format such as, for example, binary data, comma delimited data, tab delimited data, structured query language (SQL) structures, etc.

While an example manner of implementing the LSE controller 1000 is illustrated in FIG. 10, one or more of the elements, processes, and/or devices illustrated in FIG. 10 may be combined, divided, re-arranged, omitted, eliminated, and/or implemented in any other way. Further, the example thread controller 1010, the example core interface 1020, the example memory interface 1030, the example HWA configurator interface 1040, the example data multiplexer 1050, the example CRC logic controller 1060, and the example database 1070, and/or, more generally, the example LSE controller 1000 of FIG. 10 may be implemented by hardware, software, firmware, and/or any combination of hardware, software, and/or firmware. Thus, for example, any of the example thread controller 1010, the example core interface 1020, the example memory interface 1030, the example HWA configurator interface 1040, the example data multiplexer 1050, the example CRC logic controller 1060, and the example database 1070, and/or, more generally, the example LSE controller 1000 could be implemented by one or more analog or digital circuit(s), logic circuits, programmable processor(s), programmable controller(s), graphics processing unit(s) (GPU(s)), DSP(s), ASIC(s), PLD(s), and/or FPLD(s). When reading any of the apparatus or system claims of this patent to cover a purely software and/or firmware implementation, at least one of the example thread controller 1010, the example core interface 1020, the example memory interface 1030, the example HWA configurator interface 1040, the example data multiplexer 1050, the example CRC logic controller 1060, and/or the example database 1070 is/are hereby expressly defined to include a non-transitory computer readable storage device or storage disk such as non-volatile memory (e.g., ROM, EEPROM, flash memory, etc.), volatile memory (e.g., SDRAM, DRAM, etc., and/or any other type of RAM device), etc., including the software and/or firmware. Further still, the example LSE controller 1000 of FIG. 10 may include one or more elements, processes, and/or devices in addition to, or instead of, those illustrated in FIG. 10, and/or may include more than one of any or all of the illustrated elements, processes, and devices.

FIG. 11 depicts an example implementation of a core controller 1100. The core controller 1100 can correspond to another example implementation of the cores 208 of FIG. 2. In the illustrated example of FIG. 11, the core controller 1100 includes an example LSE interface 1110, an example core configurator 1120, an example image data processor 1130, and an example parameter calculator 1140.

In the illustrated example of FIG. 11, the core controller 1100 includes the LSE interface 1110 to transmit data to and/or receive data from a different controller and/or control logic, such as the LSE 206 of FIG. 2, the LSE controller 1000 of FIG. 10, etc. In some examples, the LSE interface 1110 pre-processes, formats, converts, and/or otherwise translates data from a first data format used by the core controller 1100 to a second data format different from the first data format prior to transmission. In some examples, the LSE interface 1110 translates data in the first data format to the second data format prior to transmitting the data in the second data format to the different controller and/or control logic. Alternatively, the LSE interface 1110 may convert data from the first data format to a third data format that corresponds to a format to facilitate an I2C bus, a UART bus, a SPI bus, etc.

In the illustrated example of FIG. 11, the core controller 1100 includes the core configurator 1120 to obtain configuration information to configure the core controller 1100. In some examples, the core configurator 1120 can configure the parameter calculator 1140 to determine an image data statistic or other parameter of interest based on the configuration information. For example, the core configurator 1120 can configure the parameter calculator 1140 to calculate a first image data statistic corresponding to a maximum value for a set of pixels. In other examples, the core configurator 1120 can determine a second image data statistic corresponding to a minimum value for a set of pixel values. In some examples, the core configurator 1120 obtains the configuration information from the HWA configurator 406 of FIG. 4, one or both of the host devices 214A-B of FIG. 2, etc.

In the illustrated example of FIG. 11, the core controller 1100 includes the image data processor 1130 to extract data or information of interest from image data obtained by the LSE interface 1110. For example, the image data processor 1130 can determine values associated with pixels of an image frame captured by an image data source (e.g., the image data source 104 of FIG. 1) based on input image data (e.g., the input image data 116 of FIG. 1). In such examples, the image data processor 1130 can extract and/or otherwise identify RGB pixel values and/or values associated with at least one of brightness, hue, or saturation. In other examples, the image data processor 1130 can determine a number of rows (e.g., an image frame height), a number of columns (e.g., an image frame width), a number of bands, a number of bits per pixel (bpp), a file type, etc., associated with obtained image data. In such examples, the image data processor 1130 can determine when a complete or entire image frame has been processed.

In some examples, the image data processor 1130 generates processed image data by executing one or more image processing tasks on obtained image data. For example, the image data processor 1130 can generate processed image data by identifying wide dynamic range features, executing defect pixel correction techniques, decompanding the obtained image data (e.g., converting image data back into the linear domain), etc., and/or a combination thereof. In some examples, the image data processor 1130 generate processed image data by executing and/or otherwise implementing lens shading correction, lens distortion correction, noise filtering, tone mapping, RGB conversion, color plane conversion, edge enhancement, histogram extraction, etc., and/or a combination thereof on obtained image data. In some examples, the image data processor 1130 can execute and/or otherwise implement any of the above-described processes, transformation filters, etc., to generate processed image data prior to the CRC logic controller 1060 of FIG. 10 executing a CRC signature task on the processed image data.

In some examples, the image data processor 1130 transforms pixel data by executing a transformation operation such as a neighborhood aware pixel transformation. For example, the image data processor 1130 can generate a signature (e.g., a bit signature) by executing a census transform operation on image data (e.g., the extracted data or information of interest from image data obtained by the LSE interface 1110). For example, the image data processor 1130 can apply and/or otherwise execute a census transform algorithm on pixel data to generate census transform data. In such examples, the image data processor 1130 can generate a bit signature by arranging the census transform data into a bit string (e.g., a bit string having a size or length of 8 bits, 16 bits, 32 bits, etc.). The image data processor 1130 can generate transformed pixel data by determining a decimal value that corresponds to a binary value based on the bit string. In such examples, the image data processor 1130 can determine one or more image data statistics based on the transformed pixel data (e.g., the census transformed pixel data), which, advantageously, is robust against sensor noise, transmission noise, etc., that can be associated with an image data source such as the image data source 104 of FIG. 1.

In the illustrated example of FIG. 11, the core controller 1100 includes the parameter calculator 1140 to determine one or more parameters (e.g., diagnostic parameters, image data parameters, image data statistics, image pipe statistics, etc.) associated with image data obtained by the LSE interface 1110. For example, the parameter calculator 1140 can determine a maximum value, a minimum value, a sum, etc., associated with a set of pixel values associated with an image frame of interest to process. In some examples, the parameter calculator 1140 can determine one or more parameters associated with processed image data generated by the image data extractor 1130. For example, the parameter calculator 1140 can determine one or more parameters based on any output generated by the image data processor 1130, where the output can correspond to processed image data While an example manner of implementing the core controller 1100 is illustrated in FIG. 11, one or more of the elements, processes, and/or devices illustrated in FIG. 11 may be combined, divided, re-arranged, omitted, eliminated, and/or implemented in any other way. Further, the example LSE interface 1110, the example core configurator 1120, the example image data processor 1130, the example parameter calculator 1140, and/or, more generally, the example core controller 1100 of FIG. 11 may be implemented by hardware, software, firmware, and/or any combination of hardware, software, and/or firmware. Thus, for example, any of the example LSE interface 1110, the example core configurator 1120, the example image data processor 1130, the example parameter calculator 1140, and/or, more generally, the example core controller 1100 could be implemented by one or more analog or digital circuit(s), logic circuits, programmable processor(s), programmable controller(s), graphics processing unit(s) (GPU(s)), DSP(s), ASIC(s), PLD(s), and/or FPLD(s). When reading any of the apparatus or system claims of this patent to cover a purely software and/or firmware implementation, at least one of the example LSE interface 1110, the example core configurator 1120, the example image data processor 1130, the example parameter calculator 1140 is/are hereby expressly defined to include a non-transitory computer readable storage device or storage disk such as non-volatile memory (e.g., ROM, EEPROM, flash memory, etc.), volatile memory (e.g., SDRAM, DRAM, etc., and/or any other type of RAM device), etc., including the software and/or firmware. Further still, the example core controller 1100 of FIG. 11 may include one or more elements, processes, and/or devices in addition to, or instead of, those illustrated in FIG. 11, and/or may include more than one of any or all of the illustrated elements, processes, and devices.

Figure 12:
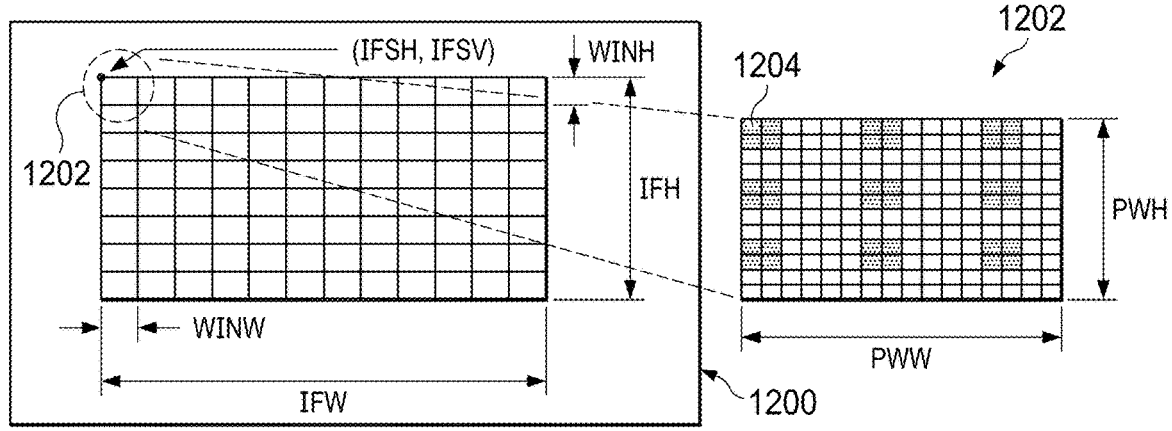
FIG. 12 depicts a schematic illustration of example image data that may be processed by the SOC of FIG. 2.

FIG. 12 depicts a schematic illustration of example image data 1200. The image data 1200 of FIG. 12 can correspond to an image frame of interest to be processed by the HWA 204 and/or, more generally, the frame freeze detection system 200 of FIG. 2 to detect a frame freeze condition. For example, the image data 1200 can be pixel data. In FIG. 12, the image data 1200 includes example pixel windows 1202 each corresponding to a set of pixel values. For example, the pixel values can correspond to an RGB pixel value or other type of pixel value. In other examples, the pixel values can be representative of image characteristics such as brightness, hue, and/or saturation.

In the illustrated example of FIG. 12, each of the pixel windows 1202 has example pixel values 1204 arranged in a window having a size of pixel window height (PWH) by pixel window width (PWW). PWH is a height of the window corresponding to a first quantity of pixel values. PWW is a width of the window corresponding to a second quantity of pixel values. In some examples, the first and second quantity of pixel values are the same while, in other examples, the first and second quantity of pixel values are different.

In the illustrated example of FIG. 12, the image data 1200 can correspond to an image frame (e.g., an entire image frame, a complete image frame, etc.) of interest to process. The image data 1200 of FIG. 12 is arranged in a window having a size of image frame height (IFH) by image frame width (IFW). IFH is a height of the image frame corresponding to a first quantity of pixel windows. IFW is a width of the image frame corresponding to a second quantity of pixel windows. In some examples, the first and second quantity of pixel windows are the same while, in other examples, the first and second quantity of pixel windows are different.

In the illustrated example of FIG. 12, the HWA 204 and/or, more generally, the frame freeze detection system 200 of FIG. 2 can process the image data 1200 by starting at a pixel window of interest. For example, the HWA 204 and/or, more generally, the frame freeze detection system 200 of FIG. 2 can process the image data 1200 by starting at an initial pixel window designated by image frame start horizontal (IFSH) and image frame start vertical (IFSV). In FIG. 12, the IFSH and the IFSV corresponds to a first one of the pixel windows 1202. In such examples, the HWA 204 and/or, more generally, the frame freeze detection system 200 of FIG. 2 can process the first one of the pixel windows 1202 and proceed from left-to-right and top-to-bottom until an entirety of the image data 1200 has been processed. Alternatively, the IFSH and the IFSV may be a different one of the pixel windows 1202 and/or a different order of the pixel windows may be processed. In response to the HWA 204 and/or, more generally, the frame freeze detection system 200 processing an entirety of the image data 1200 of FIG. 12, the HWA 204 and/or, more generally, the frame freeze detection system 200 can calculate and/or otherwise determine one or more image parameters based on the processed image data 1200.

Figure 13:
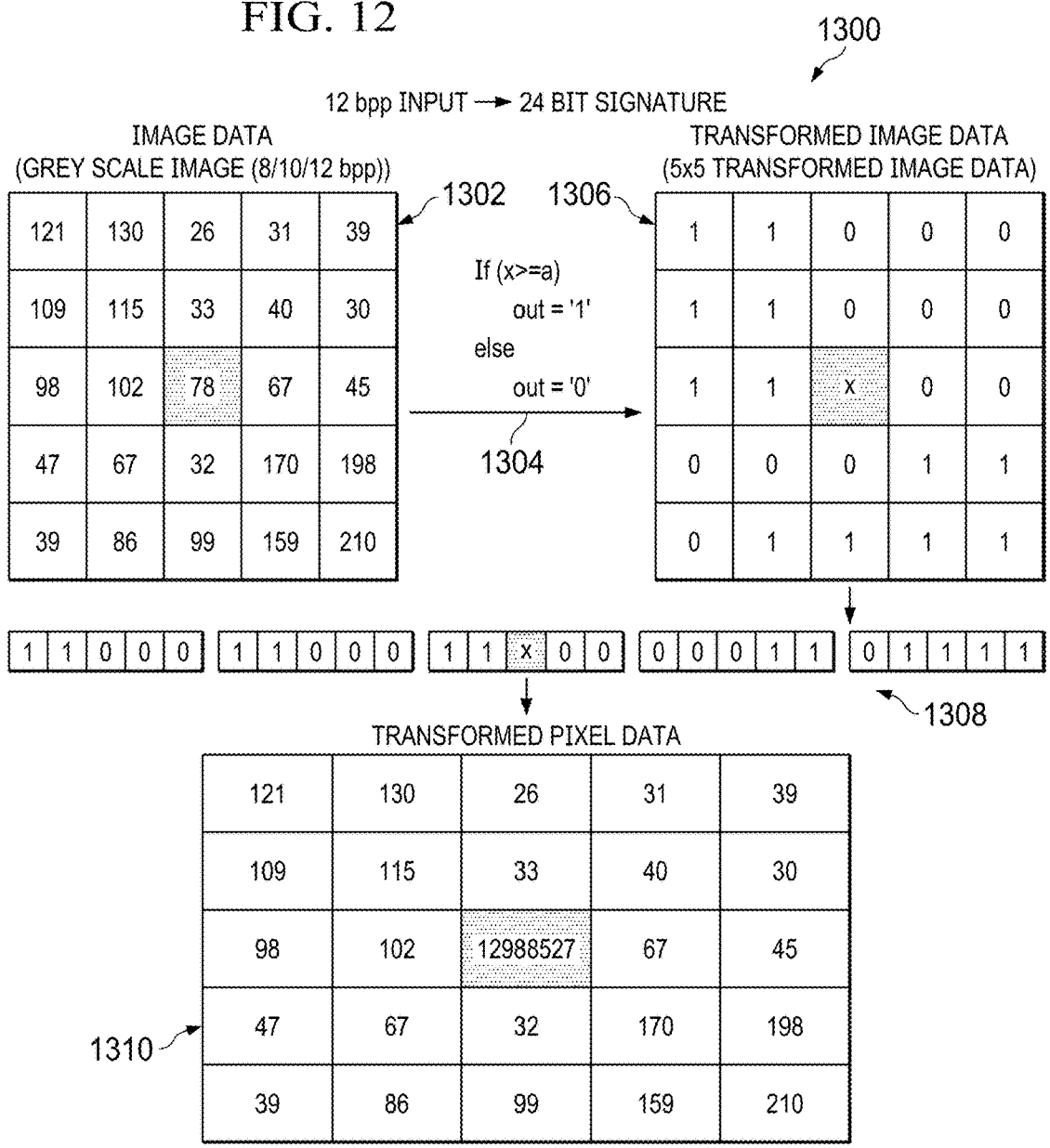
FIG. 13 depicts an example transformation workflow that may be executed by the SOC of FIG. 2.

FIG. 13 depicts an example transformation workflow 1300. The transformation workflow 1300 of FIG. 13 can be performed and/or otherwise executed by the cores 208 of FIG. 2, the core controller 1100 of FIG. 11, etc. In some examples, the transformation workflow 1300 of FIG. 13 can be performed and/or otherwise executed by the LSE 206, the first host device 214A of FIGS. 2-3, the second host device 214B of FIGS. 2-3, the vision processor 226 of FIGS. 2-3, etc. In FIG. 13, the transformation workflow 1300 is an example implementation of a neighborhood aware pixel transformation. For example, the transformation workflow 1300 can correspond to a census transformation or any other type of pixel transformation. Alternatively, any other image data transformation operation may be executed.

In the illustrated example of FIG. 13, the cores 208 and/or the core controller 1100 can obtain example image data 1302 and execute an example neighborhood aware pixel transformation operation (e.g., a census transform algorithm, a census transform, a census transform operation, etc.) 1304 on the image data 1302 to generate example transformed image data (e.g., census transform data) 1306. In FIG. 13, the image data 1302 corresponds to raw image data, luma data, chroma data, image data associated with a grey scale image having either 8, 10, or 12 bits per pixel (bpp), etc., and/or any other processed or extracted image data from the image data source 104 of FIG. 1. For example, the image data 1302 of FIG. 13 can correspond to the image data 1200 of FIG. 12, a portion of the image data 1200 of FIG. 12, one or more of the pixel windows 1202 of FIG. 12, etc. In FIG. 13, the image data 1302 has 25 pixel values arranged in a five-by-five grid or square. Alternatively, the image data 1302 and/or the transformed image data 1306 may have a different number of pixel values and/or a different arrangement of the pixel values.

In the illustrated example of FIG. 13, the cores 208 and/or the core controller 1100 can execute the neighborhood aware pixel transformation operation 1304 to determine whether a pixel value of interest (e.g., one of the 25 pixel values of the image data 1302) is greater than a center pixel value. In FIG. 13, the center pixel value is 78. For example, the cores 208 and/or the core controller 1100 can execute the neighborhood aware pixel transformation operation 1304 to output a value of "1" when a pixel value of interest is greater than or equal to 78 and a value of "0" when the pixel value of interest is not greater than 78. In such examples, the cores 208 and/or the core controller 1100 can generate the transformed image data 1306 depicted in FIG. 13 by executing the neighborhood aware pixel transformation operation 1304 on the pixel values included in the image data 1302.

In the illustrated example of FIG. 13, the cores 208 and/or the core controller 1100 can generate an example bit signature 1308 based on the transformed image data 1306. In FIG. 13, the transformed image data 1306 is a five-by-five grid or square with a center data value having an "X" or don't care value. The cores 208 and/or the core controller 1100 can generate the bit signature 1308 by arranging the transformed image data 1306 into a bit string having a size or length of 24 bits, where the "X" value is not included. Alternatively, the bit signature 1308 may be a different size. The cores 208 and/or the core controller 1100 can generate example transformed pixel data (e.g., census transformed pixel data) 1310 by replacing the center pixel value of the image data 1302 (e.g., the pixel value of 78) with a value corresponding to the bit signature 1308. For example, the cores 208 and/or the core controller 1100 can convert a binary value of the bit signature 1308 of 110001100011000001101111 to a decimal value of 12988527. In such examples, the decimal value of 12988527 can correspond to a transformed pixel data value (e.g., a census transform value). Alternatively, the transformed pixel data 1310 may have a different quantity of pixel values and/or a different arrangement of the pixel values.

In some examples, the cores 208 and/or the core controller 1100 generate one or more image data statistics by performing and/or otherwise executing the transformation workflow 1300. For example, the cores 208 and/or the core controller 1100 can generate transformed pixel data values for the pixel windows 1202 of FIG. 12. In such examples, the cores 208 and/or the core controller 1100 can determine a first transformed pixel data value corresponding to a first one of the pixel windows 1202, a second transformed pixel data value corresponding to a second one of the pixel windows 1202, etc. In some examples, the cores 208 and/or the core controller 1100 determine image data statistic(s) by determining a maximum value, a minimum value, a sum value, etc., of the transformed pixel data values. In some examples, the cores 208 and/or the core controller 1100 can transmit the image data statistic(s) based on the transformed pixel data values to the LSE 206 of FIG. 2, the LSE controller 1000 of FIG. 10, etc.

Advantageously, the transformation workflow 1300 of FIG. 13 can be a pixel invariant and/or pixel value neighborhood aware operation because the neighborhood aware pixel transformation operation 1304 can be robust against minor variation in incoming pixel data (e.g., a flip in one or more pixel data bits) due to sensor noise (e.g., electrical and/or signal noise associated with the image data source 104 of FIG. 1), transmission noise, etc.

Figure 14:
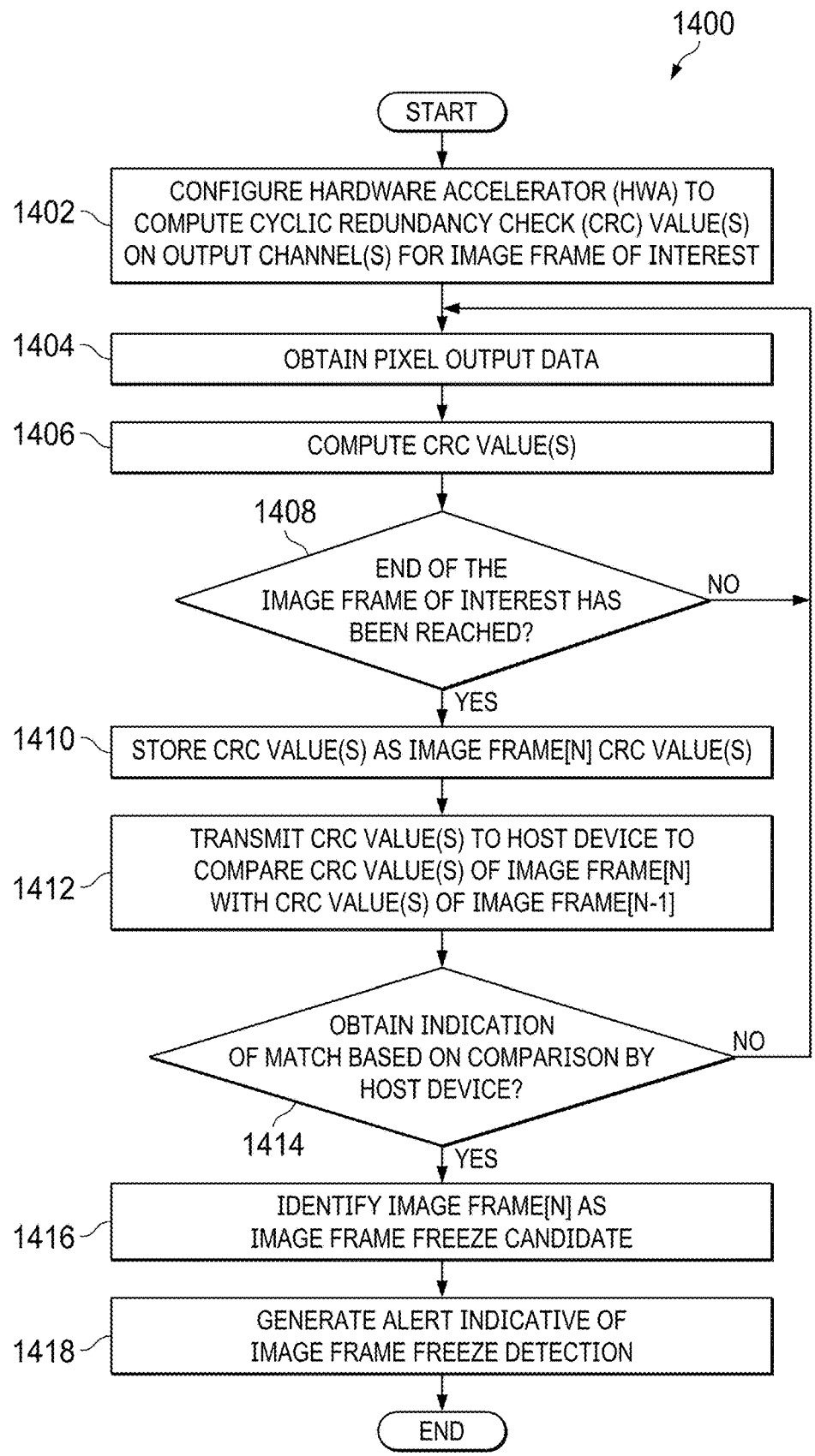
FIG. 14 is a flowchart representative of example machine readable instructions that may be executed by the SOC of FIG. 2, the example implementation of the load/store engine of FIG. 10, and/or the example implementation of the cores of FIG. 11 to detect a frame freeze condition.
Figure 15:
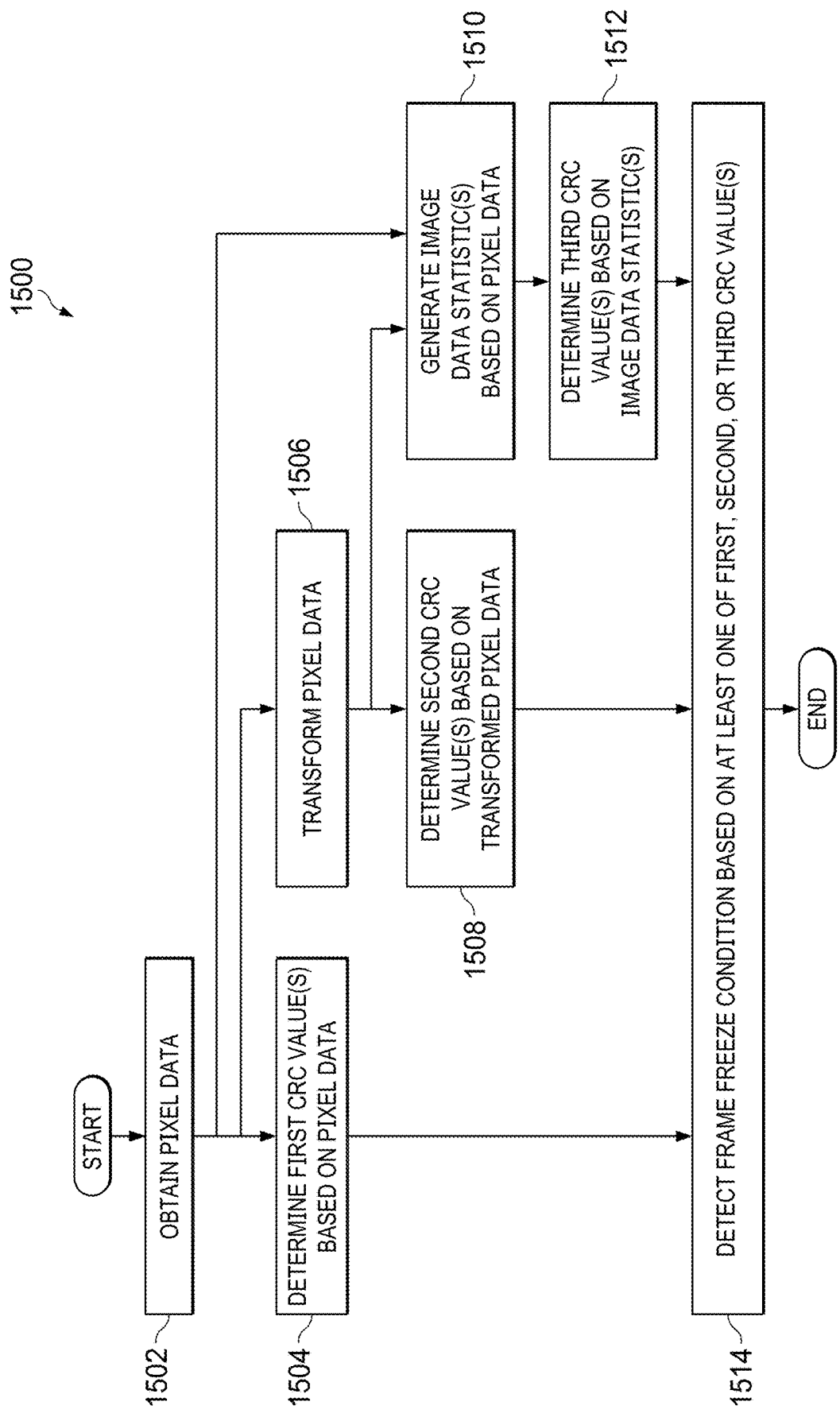
FIG. 15 is a flowchart representative of example machine readable instructions that may be executed by the SOC of FIG. 2 and/or the example implementation of the cores of FIG. 11 to detect a frame freeze condition based on different pixel processing operations.

Flowcharts representative of example hardware logic, machine readable instructions, hardware implemented state machines, and/or any combination thereof for implementing the LSE controller 1000 of FIG. 10 and/or the core controller 1100 of FIG. 11 are shown in FIGS. 14-15. The machine readable instructions may be an executable program or portion of an executable program for execution by a computer processor such as the processor 1612 shown in the example processor platform 1600 discussed below in connection with FIG. 16 and/or the processor 1712 shown in the example processor platform 1700 discussed below in connection with FIG. 17. The program may be embodied in software stored on a non-transitory computer readable storage medium such as a CD-ROM, a floppy disk, a hard drive, a digital versatile disk (DVD), a Blu-ray disk, or a memory associated with the processor 1612 of FIG. 16 and/or the processor 1712 of FIG. 17, but the entire program and/or parts thereof could alternatively be executed by a device other than the processor 1612 of FIG. 16 and/or the processor 1712 of FIG. 17 and/or embodied in firmware or dedicated hardware. Further, although the example program is described with reference to the flowcharts illustrated in FIGS. 14-15, many other methods of implementing the example LSE controller 1000 and/or the example core controller 1100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 14-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 14 is a flowchart representative of example machine readable instructions 1400 that may be executed to detect a frame freeze condition. In some examples, the machine readable instructions 1400 of FIG. 14 can be executed to implement the LSE 206, and/or, more generally, the HWA 204 of FIG. 2. In some examples, the machine readable instructions 1400 of FIG. 14 can be executed to implement the LSE controller 1000 of FIG. 10.

The machine readable instructions 1400 of FIG. 14 begin at block 1402, at which a hardware accelerator (HWA) is configured to compute cyclic redundancy check (CRC) value(s) on output channel(s) for an image frame of interest. For example, the HWA configurator interface 714 (FIG. 7) can obtain configuration information and configure the output channels 708 based on the configuration information to compute CRC value(s) for a first image frame of interest (e.g., image frame[n]). In other examples, the HWA configurator interface 1040 (FIG. 10) can configure at least one of the thread controller 1010 (FIG. 10) or the CRC logic controller 1060 (FIG. 10) to determine CRC value(s) for image frame[n].

At block 1404, pixel output data is obtained. For example, one or more of the core interfaces 704 (FIG. 7) can obtain pixel output data (e.g., pixel values, image data statistics, etc.) from the cores 208 (FIG. 2). In other examples, the core interface 1020 (FIG. 10) can obtain the pixel output data from a different controller and/or control logic, such as the core controller 1100 (FIG. 11).

At block 1406, CRC value(s) are computed. For example, the CRC logic circuit(s) 404 (FIG. 4) can generate a respective CRC value for one or more of the output channels 708. The output channels 708 can correspond to processed image data, census transform data, and/or image data statistic(s). In other examples, the CRC logic controller 1060 can calculate CRC value(s) for one or more output channels of interest, where each of the one or more output channels can correspond to data obtained from the different controller and/or control logic.

At block 1408, a determination for whether an end of the image frame of interest has been reached. For example, the CRC logic circuit(s) 404 and/or the CRC logic controller 1060 can determine that an entirety of an image frame corresponding to the image data 1200 of FIG. 12 has been processed. In such examples, the CRC logic circuit(s) 404 and/or the CRC logic controller 1060 can obtain an end of frame signal, an end of frame data bit, etc., associated with the corresponding output channel.

If, at block 1410, the end of the image frame of interest has not been reached, control returns to block 1404 to obtain additional pixel output data. If, at block 1410, the end of the image frame of interest has been reached, then, at block 1410, the CRC value(s) are stored as image frame[n] CRC value(s). For example, the CRC logic circuit(s) 404 can store CRC value(s) corresponding to an image frame being processed in the SRAM 410 (FIG. 4) and associate (e.g., store an association of) the CRC value(s) as corresponding to image frame[n]. In other examples, the CRC logic controller 1060 can store the CRC value(s) in the database 1070 (FIG. 10) and associate (e.g., store an association of) the stored CRC value(s) as corresponding to image frame[n].

At block 1412, the CRC value(s) are transmitted to a host device to compare CRC value(s) of image frame[n] with CRC value(s) of image frame[n−1]. For example, the LSE 206 can store the CRC value(s) for image frame[n] (e.g., a first image frame) in the SRAM 410 for subsequent transmission to the first host device 214A (FIG. 2) via a data flow path including at least one of the SRAM interface 408 (FIG. 4), the HWA DMA 416 (FIG. 4), the data movement fabric 218 (FIG. 2), or the host device interface 230 (FIG. 2). In other examples, the CRC logic controller 1060 can obtain first CRC value(s) associated with image frame[n] and second CRC value(s) associated with image frame[n−1] (e.g., a second image frame obtained and/or processed prior to the first image frame) from the database 1070. Alternatively, the CRC logic controller 1060 can transmit the first CRC value(s) and the second CRC value(s) to a different device for analysis.

At block 1414, a determination whether an indication has been obtained of a match based on a comparison by the host device. For example, the first host device 214A can determine that one or more CRC values corresponding to image frame[n] match one or more CRC values corresponding to image frame[n−1]. In such examples, the first host device 214A can generate an alert, an indication, etc., that indicates that a potential frame freeze condition has been detected based on CRC values associated with processed image data, census transform data, and/or image data statistic(s). In other examples, the CRC logic controller 1060 can determine that one or more of the first CRC value(s) associated with image frame[n] matches one or more of the second CRC value(s) associated with image frame[n−1]. In such examples, the CRC logic controller 1060 can generate an alert, an indication, etc., that indicates that a potential frame freeze condition has been detected.

If, at block 1414, no indication of a match based on the comparison by the host device has been obtained, control returns to block 1404 to obtain additional pixel output data. If, at block 1414, an indication of a match based on the comparison by the host device has been obtained, then, at block 1416, image frame[n] is identified as an image frame freeze candidate. For example, the first host device 214A can obtain additional information (e.g., diagnostic parameters, image data statistics, etc.) from the SRAM 410 for further processing. In other examples, the CRC logic controller 1060 can obtain the additional information from the database 1070 for further processing.

At block 1418, an alert is generated that is indicative of image frame freeze detection. For example, the first host device 214A can determine that an image frame freeze condition has been detected based on at least one of the match of CRC values or the additional information from the SRAM 410. In such examples, the first host device 214A can instruct the display controller 228 (FIG. 2) to display the alert on the display panel 210 or take other corrective or mitigating actions (e.g., instruct the display panel 210 to not use data from the image data source 104 of FIG. 1 until the image frame freeze condition is no longer detected and/or has been resolved). In response to generating the alert indicative of image frame freeze detection at block 1418, the machine readable instructions 1400 of FIG. 14 conclude.

FIG. 15 is a flowchart representative of example machine readable instructions 1500 that may be executed to detect a frame freeze condition based on different pixel processing operations. In some examples, the machine readable instructions 1500 of FIG. 15 can be executed to implement the HWA 204 of FIG. 2. In some examples, the machine readable instructions 1500 of FIG. 15 can be executed to implement the LSE controller 1000 of FIG. 10 and/or the core controller 1100 of FIG. 11.

The machine readable instructions 1500 of FIG. 15 begin at block 1502, at which pixel data is obtained. For example, the LSE 206 can obtain image data corresponding to and/or otherwise including pixel data from the image data interface 216 (FIG. 2), the SRAM 410 (FIG. 4), etc. In other examples, the thread controller 1010 (FIG. 10) can obtain pixel values from the image data source 104 (FIG. 1), the database 1070 (FIG. 10), etc.

At block 1504, first CRC value(s) are determined based on the pixel data. For example, the CRC logic circuit(s) 404 can determine first CRC value(s) based on pixel data from the image data interface 216, the SRAM 410, etc. In other examples, the CRC logic controller 1060 (FIG. 10) can determine the first CRC value(s) based on pixel data from the image data source 104, the database 1070, etc.

At block 1506, the pixel data obtained at block 1502 is transformed. For example, the cores 208 (FIG. 2) can generate the transformed pixel data 1310 (FIG. 13) based on the image data 1200 (FIG. 12). In other examples, the image data processor 1130 can generate the transformed pixel data 1310 based on the image data 1200.

At block 1508, second CRC value(s) are determined based on the transformed pixel data. For example, the CRC logic circuit(s) 404 can determine second CRC value(s) based on the transformed pixel data 1310 of FIG. 13. In other examples, the CRC logic controller 1060 can determine the second CRC value(s) based on the transformed pixel data 1310.

In response to at least one of obtaining pixel data at block 1502 or transforming pixel data at block 1506, image data statistic(s) are generated based on the pixel data at block 1510. For example, the cores 208 and/or the parameter calculator 1140 can generate one or more image data statistics based on the pixel data obtained at block 1502. In other examples, the cores 208 and/or the parameter calculator 1140 can generate one or more image data statistics based on the pixel data transformed at block 1506. In yet other examples, the cores 208 and/or the parameter calculator 1140 can generate one or more image data statistics based on at least one of the pixel data obtained at block 1502 or the pixel data transformed at block 1506.

In response to generating the image data statistic(s) based on the pixel data at block 1510, third CRC value(s) are determined based on the image data statistic(s) at block 1512. For example, the CRC logic circuit(s) 404 can determine third CRC value(s) based on one or more image data statistics from the cores 208. In other examples, the CRC logic controller 1060 can determine the third CRC value(s) based on the one or more image data statistics determined by the parameter calculator 1140 of the core controller 1100.

At block 1514, a frame freeze condition is detected based on at least one of the first CRC value(s), the second CRC value(s), or the third CRC value(s). For example, the first host device 214A (FIG. 2) can detect, determine, and/or otherwise identify a frame freeze condition associated with the image data source 104 (FIG. 1). In such examples, the first host device 214A can compare the first CRC value(s) for a first image frame of interest to CRC value(s) for a second image frame of interest that was obtained and/or otherwise processed before the first image frame of interest. The first host device 214A can detect a frame freeze condition when the CRC value(s) do not match and/or are otherwise different. In other examples, the CRC logic controller 1060 can compare the first CRC value(s) for a first image frame of interest to CRC value(s) for a second image frame of interest that was obtained and/or otherwise processed before the first image frame of interest. The first host device 214A can detect a frame freeze condition when the CRC value(s) do not match and/or are otherwise different. In yet other examples, the first host device 214A and/or the CRC logic controller 1060 can (1) perform a first comparison by comparing the first CRC value(s) for a first image frame of interest to first CRC value(s) for a second image frame of interest that was obtained and/or otherwise processed before the first image frame of interest, (2) perform a second comparison by comparing the second CRC value(s) for the first image frame of interest to second CRC value(s) for the second image frame of interest, and/or (3) perform a third comparison by comparing the third CRC value(s) for the first image frame of interest to third CRC value(s) for the second image frame of interest. In such examples, the first host device 214A and/or the CRC logic controller 1060 can detect a frame freeze condition based on at least one of the first comparison, the second comparison, or the third comparison yielding a difference in CRC values. In response to detecting the frame freeze condition based on at least one of the first, second, or third CRC value(s) at block 1514, the machine readable instructions 1500 of FIG. 15 conclude.

Figure 16:
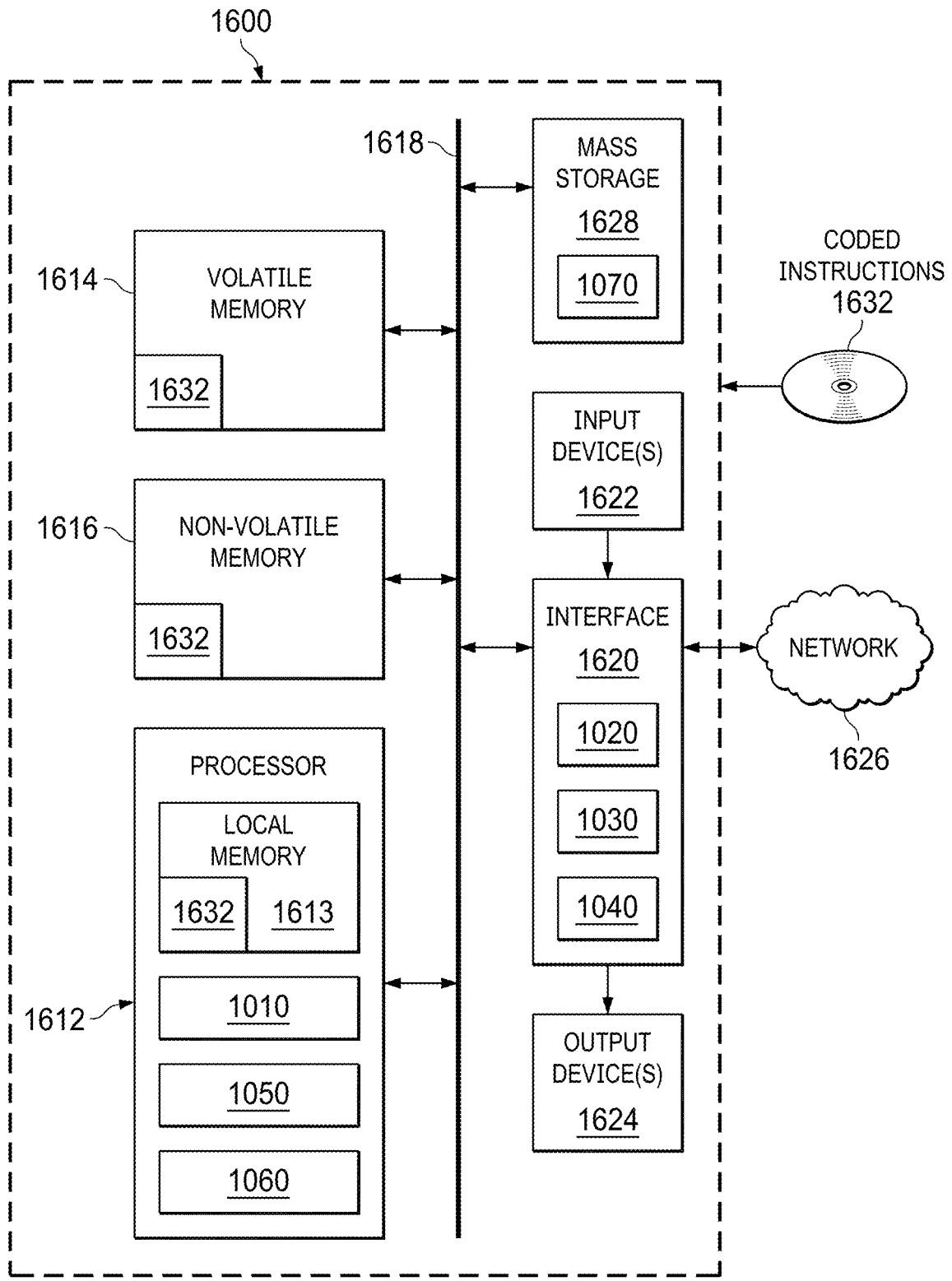
FIG. 16 is a block diagram of an example processing platform structured to execute the example machine readable instructions of FIGS. 14-15 to implement the example implementation of the load/store engine of FIG. 10.

FIG. 16 is a block diagram of an example processor platform 1600 structured to execute the instructions of FIGS. 14 and/or 15 to implement the LSE controller 1000 of FIG. 10. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), a headset or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1612 implements the example thread controller 1010, the example data multiplexer 1050, and the example CRC logic controller 1060 of FIG. 10.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by SDRAM, DRAM, RDRAM®, and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuit 1620 of the illustrated example. The output devices 1624 can be implemented, for example, by display devices (e.g., a LED, an OLED, a LCD, a cathode ray tube (CRT) display, an IPS display, a touchscreen, etc.), a tactile output device, a printer, and/or speaker. The interface circuit 1620 of the illustrated example, thus, typically includes a graphics driver card, a graphics driver chip, and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1620 implements the example core interface 1020, the example memory interface 1030, and the example HWA configurator interface 1040 of FIG. 10.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and DVD drives. In this example, the one or more mass storage devices 1628 implement the example database 1070 of FIG. 10.

The machine executable instructions 1632 of FIGS. 14-15 may be stored in the mass storage device 1628, in the volatile memory 1614, in the non-volatile memory 1616, and/or on a removable non-transitory computer readable storage medium such as a CD or DVD.

Figure 17:
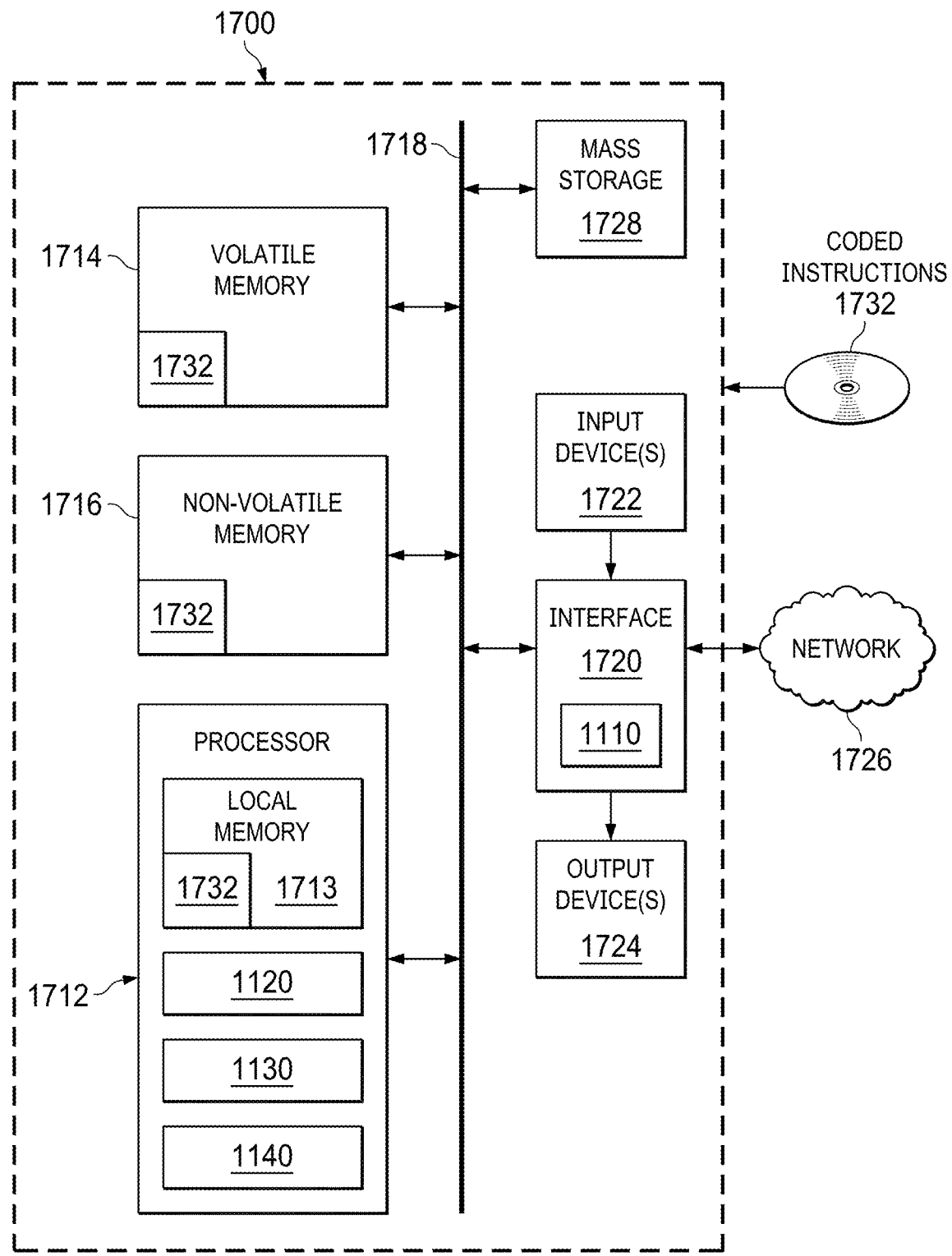
FIG. 17 is a block diagram of an example processing platform structured to execute the example machine readable instructions of FIG. 15 to implement the example implementation of the cores of FIG. 11.

FIG. 17 is a block diagram of an example processor platform 1700 structured to execute the instructions of FIG. 15 to implement the core controller 1100 of FIG. 11. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1712 implements the example core configurator 1120, the example image data processor 1130, and the parameter calculator 1140 of FIG. 11.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by SDRAM, DRAM, RDRAM®, and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a USB, a Bluetooth® interface, a NFC interface, and/or a PCI express interface.

In the illustrated example, one or more input devices 1722 are connected to the interface circuit 1720. The input device(s) 1722 permit(s) a user to enter data and/or commands into the processor 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuit 1720 of the illustrated example. The output devices 1724 can be implemented, for example, by display devices (e.g., a LED, an OLED, a LCD, a CRT display, an IPS display, a touchscreen, etc.), a tactile output device, a printer, and/or speaker. The interface circuit 1720 of the illustrated example, thus, typically includes a graphics driver card, a graphics driver chip, and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a DSL connection, a telephone line connection, a coaxial cable system, a satellite system, a line-of-site wireless system, a cellular telephone system, etc. In this example, the interface circuit 1720 implements the example LSE interface 1110 of FIG. 11.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and DVD drives.

The machine executable instructions 1732 of FIG. 15 may be stored in the mass storage device 1728, in the volatile memory 1714, in the non-volatile memory 1716, and/or on a removable non-transitory computer readable storage medium such as a CD or DVD.

From the foregoing, it will be appreciated that example systems, methods, apparatus, and articles of manufacture have been disclosed that improve detection of an image frame freeze condition. Advantageously, the examples disclosed herein determine CRC values and can detect an image frame freeze condition based on the CRC values for consecutive or sequential image frames. The disclosed systems, methods, apparatus, and articles of manufacture improve the efficiency of using a computing device by comparing a bit string (e.g., a 16 bit string, a 32 bit string, etc.) associated with different image frames instead of comparing an entirety of the image frames against each other. The disclosed methods, apparatus, and articles of manufacture are accordingly directed to one or more improvement(s) in the functioning of a computer as the data comparison is substantially less (e.g., less computing resources required, less storage or memory resources required, etc.) than conventional techniques while the examples disclosed herein can facilitate either substantially real-time detection or memory-to-memory image pipe processing.

Example methods, apparatus, systems, and articles of manufacture for image frame freeze detection are disclosed herein. Further examples and combinations thereof include the following:

Example 1 includes a hardware accelerator comprising a core logic circuit to generate second image data based on first image data associated with a first image frame, the second image data corresponding to at least one of processed image data, transformed image data, or one or more image data statistics, a load/store engine (LSE) coupled to the core logic circuit, the LSE to determine a first CRC value based on the second image data, and a first interface coupled to a second interface, the second interface coupled to memory, the first interface to transmit the first CRC value obtained from the memory to a host device.

Example 2 includes the hardware accelerator of example 1, wherein the first interface is to cause the host device to generate an alert in response to the first CRC value matching a second CRC value, the second CRC value associated with a second image frame captured before the first image frame.

Example 3 includes the hardware accelerator of example 1, wherein the first image data includes one or more pixel values, the core logic circuit is to generate a first image data statistic of the one or more image data statistics by determining a sum of the one or more pixel values, and the LSE is to determine the first CRC value based on the sum of the one or more pixel values.

Example 4 includes the hardware accelerator of example 1, wherein the first image data includes one or more pixel values, and wherein the core logic circuit is to generate a first image data statistic of the one or more image data statistics by determining a minimum value of the one or more pixels, and generate a second image data statistic of the one or more image data statistics by determining a maximum value of the one or more pixels, and the LSE is to determine the first CRC value based on the first image data statistic or the second image data statistic.

Example 5 includes the hardware accelerator of example 1, wherein the first image data includes pixel values, the core logic circuit is to execute a neighborhood aware pixel transformation on the pixel values to generate transformed image data, determine a binary value based on a bit string corresponding to the transformed image data, and generate transformed pixel data by replacing a center pixel value of the pixel values with a decimal value corresponding to the binary value, and the LSE is to determine the first CRC value based on the transformed pixel data.

Example 6 includes the hardware accelerator of example 5, wherein the neighborhood aware pixel transformation is a census transformation.

Example 7 includes the hardware accelerator of example 1, wherein the LSE includes a logic circuit thread, the logic circuit thread including an image data buffer to obtain the first image data, a plurality of input channels, and a multiplexer, the image data buffer coupled to a first input of the multiplexer, a first input channel of the plurality of input channels coupled to a second input of the multiplexer, the multiplexer to facilitate transmission of the first image data to the core logic circuit in response to selecting the image data buffer, the multiplexer.

Example 8 includes the hardware accelerator of example 1, wherein the LSE includes third interfaces coupled to the core logic circuit, a plurality of output channels including a first output channel, and a plurality of CRC logic circuits including a first CRC logic circuit, a respective one of the plurality of CRC logic circuits coupled to a respective one of the third interfaces and a respective one of the plurality of output channels, the first CRC logic circuit to determine the first CRC value based on the second image data obtained from the first output channel.

Example 9 includes a system comprising a camera to capture an image frame, and an integrated circuit coupled to the camera, the integrated circuit including a hardware accelerator (HWA) to generate first image data based on second image data associated with the image frame, the first image data corresponding to at least one of processed image data, transformed image data, or one or more image data statistics, and determine a CRC value based on the first image data, and a host device interface to transmit the CRC value to a host device to detect an image frame freeze condition based on the CRC value.

Example 10 includes the system of example 9, wherein the image frame is a first image frame and the CRC value is a first CRC value, and further including the host device to generate an alert in response to the first CRC value matching a second CRC value, the second CRC value associated with a second image frame captured by the camera before the first image frame.

Example 11 includes the system of example 9, further including an image data interface to obtain the image frame, and wherein the integrated circuit includes a data movement fabric coupled to the image data interface and the HWA, a memory interface coupled to the data movement fabric, memory coupled to the memory interface, the memory to store the second image data, and the HWA is to obtain the second image data from the memory before generating the first image data.

Example 12 includes the system of example 9, further including an image data interface to obtain the image frame, and wherein the integrated circuit includes a data movement fabric coupled to the image data interface and the HWA, a memory interface coupled to the data movement fabric, memory coupled to the memory interface, and the HWA is to store at least one of the first image data or the CRC value in the memory after determining the at least one of the first image data or the CRC value.

Example 13 includes the system of example 9, wherein the second image data includes one or more pixel values, and the HWA is to generate a first image data statistic of the one or more image data statistics by determining a minimum value or a maximum value of the one or more pixel values, and determine the CRC value based on the minimum value or the maximum value of the one or more pixel values.

Example 14 includes the system of example 9, wherein the second image data includes pixel values, and the HWA is to execute a transformation operation on the pixel values to generate the transformed image data, determine a binary value based on a bit string corresponding to the transformed image data, generate transformed pixel data by replacing a center pixel value of the pixel values with a decimal value corresponding to the binary value, and determine the CRC value based on the transformed pixel data.

Example 15 includes the system of example 9, further including a display panel coupled to the integrated circuit, and the integrated circuit including an image data interface to obtain the image frame from the camera, a data movement fabric coupled to the image data interface, the data movement fabric to obtain the image frame from the image data interface, a memory interface coupled to the data movement fabric, the memory interface to obtain the image frame from the data movement fabric, memory coupled to the memory interface, the memory to store the image frame obtained from the memory interface, and a display controller coupled to the data movement fabric, the display controller to transmit the image frame from the data movement fabric to the display panel.

Example 16 includes a method comprising generating first image data based on second image data associated with a first image frame captured by a camera, the first image data corresponding to at least one of processed image data, transformed image data, or one or more image data statistics, determining a first CRC value based on the first image data, comparing the first CRC value to a second CRC value, the second CRC value associated with a second image frame captured by the camera prior to the first image frame, and in response to the first CRC value matching the second CRC value based on the comparison, generating an alert indicating an image frame freeze condition has been detected.

Example 17 includes the method of example 16, further including displaying the alert on a display panel, and displaying a third image frame captured by the camera after the first image frame in response to the image frame freeze condition not being detected.

Example 18 includes the method of example 16, wherein the second image data includes one or more pixel values, and further including generating the one or more image data statistics by determining a sum of the one or more pixel values, a minimum value of the one or more pixel values, or a maximum value of the one or more pixel values, and determining the first CRC value based on the sum of the one or more pixel values, the minimum value of the one or more pixel values, or the maximum value of the one or more pixel values.

Example 19 includes the method of example 16, wherein the second image data includes pixel values, and further including executing a transformation operation on the pixel values to generate the transformed image data, determining a binary value based on a bit string corresponding to the transformed image data, generating transformed pixel data by replacing a center pixel value of the pixel values with a decimal value corresponding to the binary value, and determining the first CRC value based on the transformed pixel data.

Example 20 includes the method of example 16, wherein the comparing of the first CRC value to the second CRC value is a first comparison, and further including determining a third CRC value based on the second image data, determining a fourth CRC value based on first transformed pixel data associated with the second image data, performing a second comparison of the third CRC value to a fifth CRC value associated with the second image frame, the fifth CRC value based on third image data associated with the second image frame, performing a third comparison of the fourth CRC value to a sixth CRC value associated with the second image frame, the sixth CRC value based on second transformed pixel data associated with the third image data, and in response to at least one of the first comparison, the second comparison, or the third comparison indicative of a difference between corresponding CRC values, generating the alert.

Example 21 includes the method of example 16, wherein a vehicle electronic control unit is to compare the first CRC value to the second CRC value, and further including in response to generating the alert, not displaying the first image frame on a display panel, and in response to the first CRC value not matching the second CRC value, displaying the first image frame on the display panel.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system comprising:

a camera configured to capture an image frame;

an image data interface coupled to, and configured to obtain the image frame from, the camera; and an integrated circuit coupled to the image data interface, the integrated circuit including:

a data movement fabric coupled to the image data interface;

a hardware accelerator (HWA) coupled to the data movement fabric and configured to:

generate second image data based on first image data associated with the image frame by at least performing a census transform on the first image data, arranging the second image data into a bit string, and determining a binary value based on the bit string; and determine a cyclic redundancy check (CRC) value based on the binary value generated from the census transform;

a memory interface coupled to the data movement fabric;

memory coupled to the memory interface; and a host device interface configured to transmit the CRC value to a host device to detect an image frame freeze condition based on the CRC value.

2. The system of claim 1, wherein the image frame is a first image frame and the CRC value is a first CRC value, wherein the system further includes the host device configured to generate an alert in response to the first CRC value matching a second CRC value, and wherein the second CRC value is associated with a second image frame captured by the camera before the first image frame.

3. The system of claim 1, wherein:

the memory is configured to store the first image data; and the HWA is configured to obtain the first image data from the memory before generating the second image data.

4. The system of claim 1, wherein:

the HWA is configured to store at least one of the second image data or the CRC value in the memory after determining the at least one of the second image data or the CRC value.

5. The system of claim 1, wherein the CRC value is a first CRC value, the first image data includes pixel values, and the HWA is configured to:

generate a first image data statistic by determining a minimum value or a maximum value of the pixel values; and determine a second CRC value based on the minimum value or the maximum value of the pixel values.

6. The system of claim 1, wherein the first image data includes pixel values, and the HWA is configured to:

generate transformed pixel data by replacing a center pixel value of the pixel values with a decimal value corresponding to the binary value; and determine the CRC value based on the transformed pixel data.

7. The system of claim 1, further including a display panel coupled to the integrated circuit, and wherein:

the data movement fabric is configured to obtain the image frame from the image data interface;

the memory interface is configured to obtain the image frame from the data movement fabric; and the memory is configured to store the image frame obtained from the memory interface;

wherein the integrated circuit further includes a display controller coupled to the data movement fabric, the display controller configured to transmit the image frame from the data movement fabric to the display panel.

* * * * *